(12) United States Patent
Lindberg

(10) Patent No.: US 9,331,892 B2
(45) Date of Patent: May 3, 2016

(54) SYSTEM AND METHOD FOR AUTOMATIC SUB-PANEL CREATION AND MANAGEMENT

(71) Applicant: The Nielsen Company (US), LLC, Schaumburg, IL (US)

(72) Inventor: Tero Lindberg, Espoo (FI)

(73) Assignee: THE NIELSEN COMPANY (US), LLC, New York, NY (US)

( * ) Notice: Subject to any disclaimer, the term of this patent is extended or adjusted under 35 U.S.C. 154(b) by 213 days.

(21) Appl. No.: 13/837,658

(22) Filed: Mar. 15, 2013

(65) Prior Publication Data

US 2013/0204999 A1    Aug. 8, 2013

Related U.S. Application Data

(63) Continuation-in-part of application No. 13/722,163, filed on Dec. 20, 2012, now abandoned, which is a continuation-in-part of application No. 13/001,492, filed as application No. PCT/FI2009/050186 on Mar. 9, 2009, now abandoned.

(51) Int. Cl.
    *G06F 15/173*     (2006.01)
    *H04L 12/24*     (2006.01)
    (Continued)

(52) U.S. Cl.
    CPC .............. *H04L 41/00* (2013.01); *H04L 41/142* (2013.01); *H04L 43/08* (2013.01); *H04W 24/08* (2013.01)

(58) Field of Classification Search
    USPC .......... 709/203, 221, 200, 223, 224, 217, 227
    See application file for complete search history.

(56) References Cited

U.S. PATENT DOCUMENTS

| | | |
|---|---|---|
| 5,289,526 A | 2/1994 | Chymyck et al. |
| 5,451,839 A | 9/1995 | Rappaport et al. |

(Continued)

FOREIGN PATENT DOCUMENTS

| | | |
|---|---|---|
| CN | 1629870 | 6/2005 |
| EP | 0895435 | 2/1999 |

(Continued)

OTHER PUBLICATIONS

International Searching Authority, "International Search Report," issued in connection with International Patent Application No. PCT/FI2009/050186, mailed Dec. 1, 2009 (4 pages).

(Continued)

*Primary Examiner* — El Hadji Sall
(74) *Attorney, Agent, or Firm* — Hanley, Flight & Zimmerman, LLC

(57) ABSTRACT

Systems, apparatuses and methods are disclosed for creating and managing sub-panels. Device data may be received in the system from each of a plurality of user devices, wherein the device data includes device usage data, device configuration data, demographic data and the like. Data collection rules are created or loaded into a central processing apparatus, where the device data is processed in the central processing apparatus to determine if device data related to one or more user devices complies to the data collection rules. Sub-panels may be defined in accordance with the processing, wherein the sub-panel may include one or more devices determined to be compliant with the data collection rules. Modification instructions may be generated in the central processing apparatus for the sub-panel, wherein the modification instructions are configured to be transmitted to at least some of the devices in the sub-panel, and wherein the modification instructions include data enabling each device in the sub panel to modify or enable at least one of (i) data collection operations and (ii) data reporting relating to future device data.

17 Claims, 12 Drawing Sheets

(51) Int. Cl.
*H04L 12/26* (2006.01)
*H04W 24/08* (2009.01)

(56) References Cited

U.S. PATENT DOCUMENTS

| | | | |
|---|---|---|---|
| 5,490,204 | A | 2/1996 | Gulledge |
| 5,546,444 | A | 8/1996 | Roach, Jr. et al. |
| 5,623,535 | A | 4/1997 | Leung et al. |
| 5,644,623 | A | 7/1997 | Gulledge |
| 5,754,956 | A | 5/1998 | Abreu et al. |
| 5,781,865 | A | 7/1998 | Gammon |
| 5,784,442 | A | 7/1998 | Foti |
| 5,822,410 | A | 10/1998 | McCausland et al. |
| 5,826,186 | A | 10/1998 | Mitchell et al. |
| 5,963,869 | A | 10/1999 | Fehnel |
| 6,006,085 | A | 12/1999 | Balachandran |
| 6,049,713 | A | 4/2000 | Tran et al. |
| 6,101,175 | A | 8/2000 | Schorman et al. |
| 6,134,544 | A | 10/2000 | Glitho et al. |
| 6,138,020 | A | 10/2000 | Galyas et al. |
| 6,169,896 | B1 | 1/2001 | Sant et al. |
| 6,212,386 | B1 | 4/2001 | Briere et al. |
| 6,223,031 | B1 | 4/2001 | Naslund |
| 6,421,434 | B1 | 7/2002 | Rosu |
| 6,466,783 | B2 | 10/2002 | Dahm et al. |
| 6,516,189 | B1 | 2/2003 | Frangione et al. |
| 6,597,671 | B1 | 7/2003 | Ahmadi et al. |
| 6,628,953 | B1 | 9/2003 | Dillon et al. |
| 6,717,547 | B2 | 4/2004 | Spilker, Jr. et al. |
| 6,788,926 | B1 | 9/2004 | Frangione et al. |
| 6,999,766 | B1 | 2/2006 | Padovani |
| 7,013,136 | B2 | 3/2006 | Frangione et al. |
| 7,194,281 | B2 | 3/2007 | Peng et al. |
| 7,203,510 | B2 | 4/2007 | Tanoue |
| 7,409,214 | B2 | 8/2008 | Lee |
| 7,505,765 | B2 | 3/2009 | Frangione et al. |
| 7,734,309 | B2 | 6/2010 | Chi et al. |
| 7,885,239 | B1 | 2/2011 | Oroskar et al. |
| 8,447,293 | B2 | 5/2013 | Stapleton et al. |
| 2002/0129138 | A1 | 9/2002 | Carter |
| 2002/0155831 | A1 | 10/2002 | Fodor et al. |
| 2002/0174222 | A1 | 11/2002 | Cox |
| 2003/0064722 | A1 | 4/2003 | Frangione et al. |
| 2003/0235180 | A1 | 12/2003 | Oprescu-Surcobe et al. |
| 2004/0142693 | A1 | 7/2004 | Feder et al. |
| 2004/0202131 | A1 | 10/2004 | An et al. |
| 2005/0043046 | A1 | 2/2005 | Lee |
| 2005/0287954 | A1 | 12/2005 | Lim et al. |
| 2006/0023642 | A1* | 2/2006 | Roskowski et al. ............ 370/254 |
| 2006/0089153 | A1 | 4/2006 | Sheynblat |
| 2006/0270401 | A1 | 11/2006 | Frangione et al. |
| 2006/0284981 | A1 | 12/2006 | Erol et al. |
| 2007/0058678 | A1 | 3/2007 | Thompson, III et al. |
| 2007/0060084 | A1 | 3/2007 | Thompson, III et al. |
| 2007/0243864 | A1 | 10/2007 | Jaquet |
| 2008/0299910 | A1 | 12/2008 | Petersen et al. |
| 2009/0187593 | A1 | 7/2009 | Chen et al. |
| 2009/0311966 | A1 | 12/2009 | Stapleton et al. |
| 2011/0099142 | A1 | 4/2011 | Karjalainen et al. |
| 2013/0183926 | A1 | 7/2013 | Lindberg et al. |
| 2014/0018034 | A1 | 1/2014 | Lindberg |

FOREIGN PATENT DOCUMENTS

| | | |
|---|---|---|
| EP | 1011283 | 6/2000 |
| EP | 1892638 | 2/2008 |
| GB | 2426153 | 11/2006 |
| JP | 09312870 | 12/1997 |
| WO | 9533352 | 12/1995 |
| WO | 9641492 | 12/1996 |
| WO | 9833344 | 7/1998 |
| WO | 9837724 | 8/1998 |
| WO | 9853621 | 11/1998 |
| WO | 0205577 | 1/2002 |
| WO | 2007044356 | 4/2007 |
| WO | 2008118119 | 10/2008 |

OTHER PUBLICATIONS

International Searching Authority, "Written Opinion," issued in connection with International Patent Application No. PCT/FI2009/050186, mailed Dec. 1, 2009 (6 pages).

International Bureau, "International Preliminary Report on Patentability," issued in connection with International Patent Application No. PCT/FI2009/050186, mailed Sep. 13, 2011 (7 pages).

United States Patent and Trademark Office, "Notice of Elections/Restrictions," issued in connection with U.S. Appl. No. 13/001,492, mailed Aug. 23, 2013 (6 pages).

United States Patent and Trademark Office, "Non-Final Office Action," issued in connection with U.S. Appl. No. 13/722,163, mailed Jun. 16, 2014 (8 pages).

Dolcera Wiki, "CDMA Basics," Jul. 29, 2007, retrieved from <http://www.dolcera.com/wiki/index.php?title-CDMA_Basics>, retrieved on Feb. 21, 2008 (9 pages).

European Patent Office, "European Search Report," issued in connection with European Patent Application No. 09007946.8, mailed May 31, 2013 (7 pages).

Geckobeach, "How to Interpret the Cellular/Mobile Equipment Maps," Feb. 21, 2008, retrieved from <http://www.geckobeach.com/cellular/maps/mapfaqs.php>, retrieved on Feb. 21, 2008 (4 pages).

Google, "Google Announces Launch of Google Maps for Mobile with 'My Location' Technology," Nov. 28, 2007, retrieved from <http://www.google.com/intl/en/press/annc/20081128_maps_mobile_my_location_technology> retrieved on Feb. 28, 2008 (1 page).

International Searching Authority, "International Preliminary Report on Patentability" issued in connection with International Patent Application No. PCT/US2008/062609, mailed Dec. 1, 2009 (9 pages).

International Searching Authority, "International Search Report" issued in connection with International Patent Application No. PCT/US2008/062609, mailed Oct. 24, 2008 (3 pages).

International Searching Authority, "Written Opinion" issued in connection with International Patent Application No. PCT/US2008/062609, mailed Oct. 24, 2008 (8 pages).

International Searching Authority, "International Search Report," issued in connection with International Patent Application No. PCT/US00/06652, mailed Jul. 11, 2000 (3 pages).

International Preliminary Examining Authority, "Written Opinion," issued in connection with International Patent Application No. PCT/US00/06652, mailed Jan. 25, 2001 (8 pages).

International Preliminary Examining Authority, "International Report on Patentability," issued in connection with International Patent Application No. PCT/US00/06652, mailed Jun. 21, 2001 (8 pages).

IP Australia, "Notice of Acceptance," issued in connection with Australian Patent Application No. 38823/00, mailed Sep. 3, 2004 (2 pages).

State Intellectual Property Office of P.R.C., "First Office Action," issued in connection with Chinese Patent Application No. 200980159184.3, mailed Dec. 30, 2013 (11 pages).

United States Patent and Trademark Office, "Non-Final Office Action," issued in connection with U.S. Appl. No. 10/230,525 mailed Apr. 22, 2005 (17 pages).

United States Patent and Trademark Office, "Notice of Allowance," issued in connection with U.S. Appl. No. 10/230,525 mailed Sep. 22, 2005 (6 pages).

United States Patent and Trademark Office, "Final Office Action," issued in connection with U.S. Appl. No. 11/809,318 mailed Dec. 7, 2011 (9 pages).

United States Patent and Trademark Office, "Final Office Action," issued in connection with U.S. Appl. No. 11/809,318 mailed Jan. 16, 2014 (9 pages).

United States Patent and Trademark Office, "Final Office Action," issued in connection with U.S. Appl. No. 11/809,318 mailed Oct. 8, 2010 (8 pages).

(56) References Cited

OTHER PUBLICATIONS

United States Patent and Trademark Office, "Non-Final Office Action," issued in connection with U.S. Appl. No. 09/271,105 mailed Dec. 5, 2001 (16 pages).

United States Patent and Trademark Office, "Non-Final Office Action," issued in connection with U.S. Appl. No. 09/271,105 mailed Jun. 25, 2002 (6 pages).

United States Patent and Trademark Office, "Notice of Allowance," issued in connection with U.S. Appl. No. 09/271,105 mailed Sep. 9, 2002 (7 pages).

United States Patent and Trademark Office, "Office Action," issued in connection with U.S. Appl. No. 09/271,105 mailed Aug. 27, 2001 (8 pages).

United States Patent and Trademark Office, "Elections/Restrictions," issued in connection with U.S. Appl. No. 09/392,012 mailed Mar. 13, 2003 (6 pages).

United States Patent and Trademark Office, "Non-Final Office Action," issued in connection with U.S. Appl. No. 09/392,012 mailed Aug. 25, 2003 (20 pages).

United States Patent and Trademark Office, "Notice of Allowance," issued in connection with U.S. Appl. No. 09/392,012 mailed May 7, 2004 (4 pages).

United States Patent and Trademark Office, "Non-Final Office Action," issued in connection with U.S. Appl. No. 11/362,378 mailed May 28, 2008 (6 pages).

United States Patent and Trademark Office, "Notice of Allowance," issued in connection with U.S. Appl. No. 11/362,378 mailed Nov. 17, 2008 (4 pages).

United States Patent and Trademark Office, "Advisory Action," issued in connection with U.S. Appl. No. 11/809,318 mailed May 10, 2012 (3 pages).

United States Patent and Trademark Office, "Non-Final Office Action," issued in connection with U.S. Appl. No. 11/809,318 mailed Apr. 16, 2010 (7 pages).

United States Patent and Trademark Office, "Non-Final Office Action," issued in connection with U.S. Appl. No. 11/809,318 mailed Apr. 5, 2011 (8 pages).

United States Patent and Trademark Office, "Non-Final Office Action," issued in connection with U.S. Appl. No. 11/809,318 mailed Jul. 8, 2013 (10 pages).

United States Patent and Trademark Office, "Notice of Allowance," issued in connection with U.S. Appl. No. 12/140,896 mailed Jan. 22, 2013 (5 pages).

United States Patent and Trademark Office, "Non-Final Office Action," issued in connection with U.S. Appl. No. 12/140,896 mailed Mar. 29, 2012 (6 pages).

United States Patent and Trademark Office, "Non-Final Office Action," issued in connection with U.S. Appl. No. 14/024,794 mailed Jul. 17, 2015, 19 pages.

\* cited by examiner

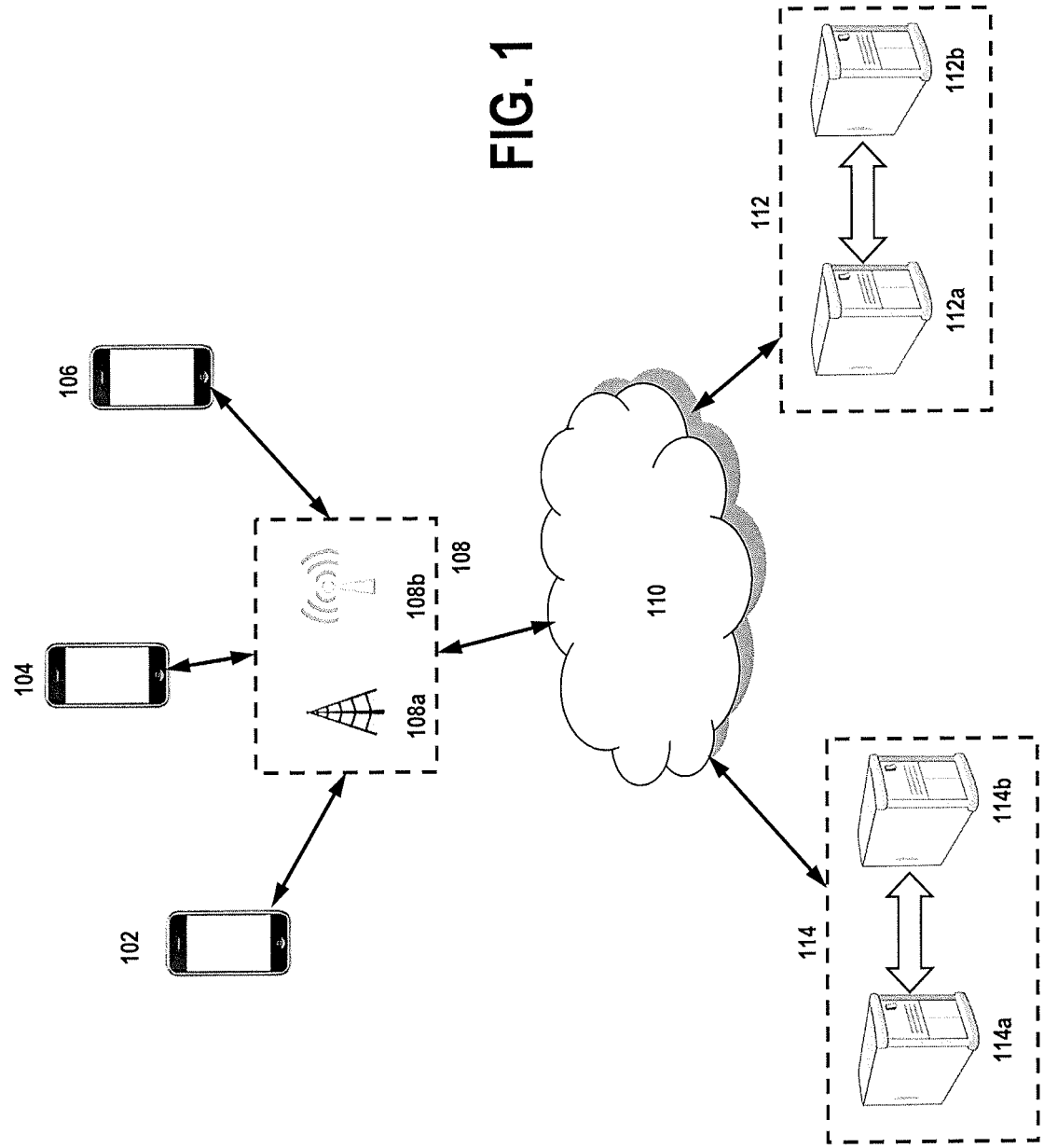

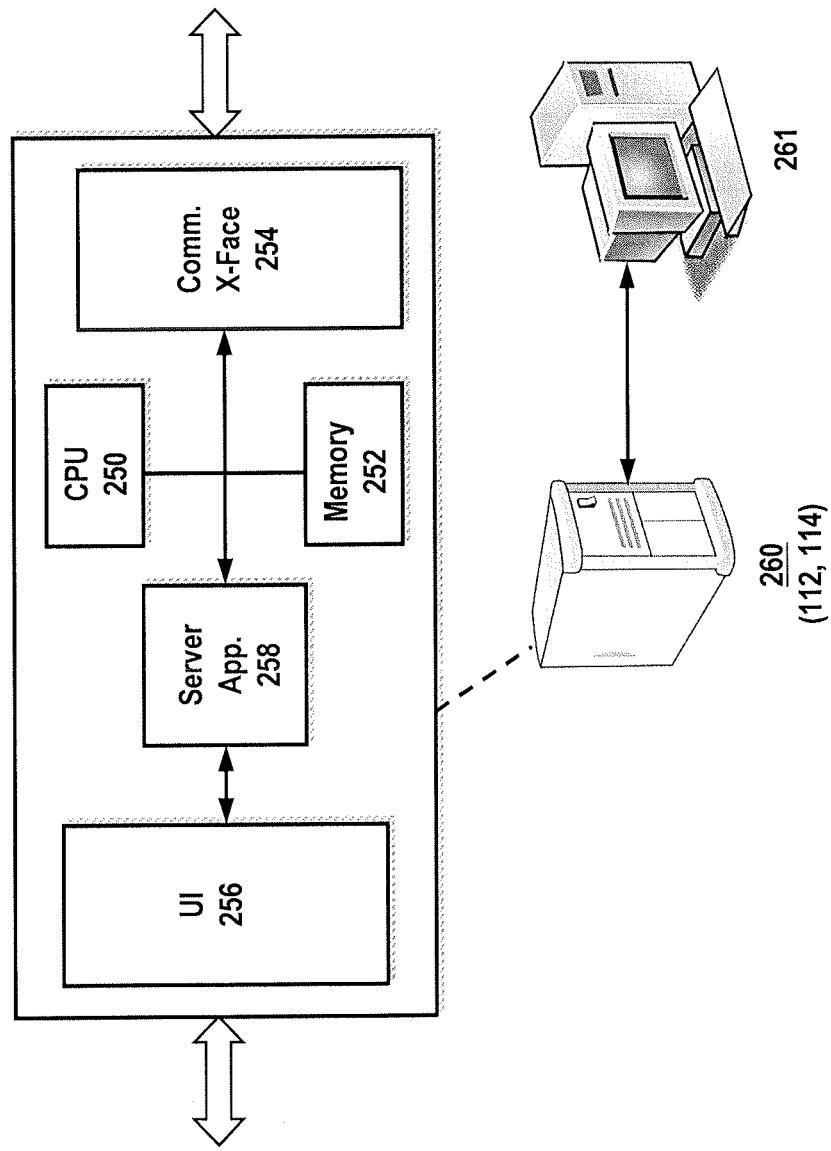

| | Panel A | Data Types | Panel B | Data Types | Panel C | Data Types | Final Data Types |
|---|---|---|---|---|---|---|---|
| Device 01 | X | 1, 2, 8, 12 | | | | 6 | 1, 2, 6, 8, 12 |
| Device 02 | | | | | | | |
| Device 03 | | | X | 3, 6, 10 | | 3 | 3, 6, 10 |
| Device 04 | X | 1, 2, 8, 12 | | | X | 6 | 1, 2, 6, 8, 12 |
| Device 05 | X | 1, 2, 8, 12 | | | | 4 | 1, 2, 8, 12 |
| Device 06 | | | | | | | |
| Device 07 | | | X | 3, 6, 10 | | 3 | 3, 6, 10 |
| Device 08 | X | 1, 2, 8, 12 | | | | 4 | 1, 2, 8, 12 |
| Device 09 | X | 1, 2, 8, 12 | X | 3, 6, 10 | | 4 | 1, 2, 8, 12 |
| Device 10 | | | | | X | 3 | 3, 6, 10 |
| Device 11 | X | 1, 2, 8, 12 | | | | 6 | 1, 2, 6, 8, 12 |

SYSTEM AND METHOD FOR AUTOMATIC SUB-PANEL CREATION AND MANAGEMENT

RELATED APPLICATIONS

The present application is a continuation-in-part of U.S. non-provisional patent application Ser. No. 13/722,163 to Lindberg et al., titled "Apparatus, System And Method For Mobile Terminal Data Analysis and Distribution Utilizing Internal Proxies" filed Dec. 20, 2012, which is a continuation-in-part of U.S. non-provisional patent application Ser. No. 13/001,492 filed on Dec. 27, 2010 to Juha Karjalainen et al. titled "Mobile Terminal and Method for Providing Life Observations and a Related Server Arrangement and Method With Data Analysis, Distribution and Terminal Guiding," which is a U.S. nationalization of International Application No. PCT/FI2009/050186 filed on Mar. 9, 2009. Each of these is hereby incorporated herein by reference in its entirety.

TECHNICAL FIELD

The present disclosure generally relates to mobile devices and communications networks. In particular the disclosure is directed to processor-based techniques for analyzing panels of processing devices equipped with media/data monitoring software, wherein certain characteristics of each of the analyzed processing devices are used to create and manage sub-panels.

BACKGROUND INFORMATION

There has been considerable interest in monitoring the use of mobile terminals for audience measurement and/or marketing purposes. Using software and/or hardware solutions, characteristics of device usage, and media/application exposure and use may be effectively monitored. Technologies such as GPS (Global Positioning System) have also been utilized for locating and consensually tracking people through a mobile device. Items such as photographs, social media, and/or micro-blog entries via the web have been utilized for various tools built for smart phones that provide "add-on" application monitoring capabilities.

It is apparent that mobile phones or "smart phones" will emerge as a dominant digital device that people will carry with them and use on a daily basis. Smart phones will function as communication devices, authentication tools, digital wallets and keys, etc. Smart phones could also be exploited as "always-on" observers as well. Smart phone devices are possibly in the best position to become universal digital observers, being able to track locations, temperatures, movements, communication activities, proximity to other people, social interactions, etc. There is no strict limit with regard to the possible observations as various kinds of observers and sensors may be included in the smart phones. For example, in the future the smart phones might collect a rich feed of data containing comprehensive audio and video recordings relative to each day, and thus let the people generate a digital storage of their activities.

Data that can be collected in a smart phone can naturally be used locally in the same device. For instance, temperature data can be shown on the screen of the phone. However, some data may be at least occasionally worth sending to other people, for example the current location of the device might form a useful piece of information for other people considering e.g. different "buddy tracking" purposes. One drawback associated with the contemporary solutions is that they typically implement straightforward end-to-end pipelines more or less focusing on certain kinds of data items only. In addition, the users may have to manually enable or conduct the data acquisition phase and even perform dedicated follow-up actions such as sending the data by specifically selecting an update feature of the relevant application.

A number of prior art arrangements propose to collect data points, position the user, or to make contextual data points locally available to other applications of the particular phone. For example, prior art publication WO2008/118119, incorporated by reference herein, discloses a mobile device and a method for communicating positioning data of the mobile device to a server at a periodic interval, then automatically generating in the mobile device, in response to the server, a present location profile associated with a present geographic location of the mobile device, simultaneously generating, in the mobile device, a set of adjacent profiles provided by the server as being a direction away from the present geographic location of the mobile device, and refreshing in the mobile device, the present location profile and the set of adjacent profiles at the periodic interval.

While many different areas of device and/or media monitoring is available, further improvements in device/media monitoring is desired. For the purposes of this disclosure, "monitoring" may include monitoring of data accessed, created and/or reproduced on a device, and may further include usage and data produced from "apps," "widgets," or other executable software residing on a device, as well as network and/or data usage. Different monitoring capabilities carry with them specific costs computationally and practically. Generically selecting one or more panels for monitoring is a relatively straightforward matter, as individual panelists are manually selected according to demographic or other data available. However, automatically creating and maintaining panels and sub-panels via processor-based systems has shown to be difficult, as this requires numerous considerations to be taken into account in a substantially real-time manner. As such, there is a need in the art to address these, and other, drawbacks currently existing in the art.

BRIEF SUMMARY

The techniques and arrangements in the present disclosure alleviate at least some of the drawbacks of the prior art solutions and provide a more intelligent, flexible and adaptive alternative for creating and managing sub-panels for research operation purposes. Under one embodiment, a processor-based method is disclosed for operating a sub-panel pursuant to a research operation, comprising the steps of receiving device data from each of a plurality of user devices, wherein the device data comprises at least one of device usage data, device configuration data and demographic data. After data collection rules are loaded into a central processing apparatus, the device data is processed in the central processing apparatus to determine if device data related to one or more user devices complies to the data collection rules. Next, the method may define the sub-panel in accordance with the processing step, wherein the sub-panel comprises one or more devices determined to be compliant with the data collection rules. Modification instructions may then be generated in the central processing apparatus for the sub-panel, wherein the modification instructions are configured to be transmitted to at least some of the devices in the sub-panel, and wherein the modification instructions comprise data enabling each device in the sub panel to modify or enable at least one of (i) data collection operations and (ii) data reporting relating to future device data.

Under another embodiment, a computer system is configured to communicate over a network to a plurality of portable user devices, comprising an input configured to receive device data from each of the plurality of user devices, wherein the device data comprises at least one of device usage data, device configuration data and demographic data; a storage for storing the device data and data collection rules; and a processing apparatus, operatively coupled to the input and storage, wherein the processing apparatus is configured to process the device data to determine if device data related to one or more user devices complies to the data collection rules, wherein the processing apparatus is configured to define a sub-panel based on the processed device data, wherein the sub-panel comprises one or more user devices determined to be compliant with the data collection rules, and wherein the processing apparatus is configured to generate modification instructions for the sub-panel, wherein the modification instructions are configured to be transmitted from an output of the system to at least some of the user devices in the sub-panel, and wherein the modification instructions comprise data enabling each device in the sub panel to modify or enable at least one of (i) data collection operations and (ii) data reporting relating to future device data.

As used herein, data feeds are sometimes referred to as "life feeds" and may be directed to the automatic collection and processing of computer terminal data ("life data") and enabling the transfer and distribution of this data to external entities. Life feeding may link mobile terminals to entities such as web services in an integrated manner. For example, life feeding applications may enable automatic updating of users' social networking profiles with real-time location and other data provided by the mobile terminals. A life feed may refer to all information that can be generated in response to monitoring people's everyday life, including for example data on locations, movements, activities and calendar entries. In addition to various actions and events, a life feed can also incorporate user-generated content, such as blog entries and photos. A mobile life feed may be defined as a life feed that can be generated from data provided by a mobile terminal.

An application programming interface (API) may be defined as an interface provided by one software module to other modules, typically built for the function of distributing data. An API may support, for example, queries by another system, and then supply data based on the query details. APIs also define the communications and interoperability between modules.

An agent may be defined as at least one application in a wireless device, capable of preferably seamless and automatic execution on the background (i.e., not intervening or disrupting other applications). An agent is enabled to perform operations, and communicate with the Internet, or with other applications.

Observers may be defined in this context as processes capable of generating data based on items such as queries and use of the wireless device's operating system capabilities. Observers are, in a way, sensors, which can automatically sense, for example, changes identified in a cellular base station usage (when the device jumps from the coverage of one tower to the next, for instance). Observers can also refer to channels of user-generated content such as blog entries and/or web activity.

Triggers may be defined rules and processes that cause a certain action. The present disclosure introduces novel algorithms and rules on how the observations can be done more effectively and automatically in wireless devices. Triggers can be based on time intervals, contextual changes and observations, external requests, or internal requests for example in a situation in which more data is needed for some other data points.

The concept of "intelligence" in this disclosure may be defined as a set of rules, algorithms, databases and/or processes on a tangible medium that coordinate the overall process, or individual micro-processes such as triggering logic. Intelligence is something that makes the system to work smarter, in a more optimal way, saving energy and improving accuracy. The intelligence can be based on fixed and/or self-learning, adaptive algorithms as well as on external input.

A server as used herein may refer to a node in one or more networks, such as the Internet. A server can serve clients, such as mobile agents running in mobile terminals. Clients may thus communicate with one or more centralized servers. Client-server architecture is a commonly used topology of building systems in the Internet.

The concept of processing as used herein may refer to various kinds of actions than be performed on data. These include data conversions, transformations, formulations, combinations, mash-ups enrichment, correlations, clustering, factoring, normalizing, and filtering, among others, and are applied differently in different situations. Some forms of processing are actively used in various embodiments, including combinations and mash-ups (linking data points together and building relational data structures), conversions (generating, for example, meaningful streams of information entities from raw-level, unsorted data items, such as observed location points), enrichment (adding meta data and making the data richer than originally) and filtering (leaving out data that is not relevant or needed anymore).

The expression "a plurality of" refers herein to any integer starting from two (2), e.g. two, three, or four. The expression "a number of" refers herein to any integer starting from one (1), e.g. one, two, or three. The expression "data transfer" may refer to transmitting data, receiving data, or both, depending on the role(s) of a particular entity under analysis relative a data transfer action, i.e. a role of a sender, role of a recipient, or both.

BRIEF DESCRIPTION OF THE DRAWINGS

The present invention is illustrated by way of example and not limitation in the figures of the accompanying drawings, in which like references indicate similar elements and in which:

FIG. 1 is an exemplary system diagram illustrating communication among mobile terminals to a computer network that is communicatively coupled to at least one server arrangement and external entities;

FIG. 2B is an exemplary server arrangement for receiving and processing data from a portable computing device, and for communicating with a portable computing device;

FIG. 13 illustrates an exemplary sub-panel tracking under one embodiment with various data collection reporting.

DETAILED DESCRIPTION

Figure 2A:
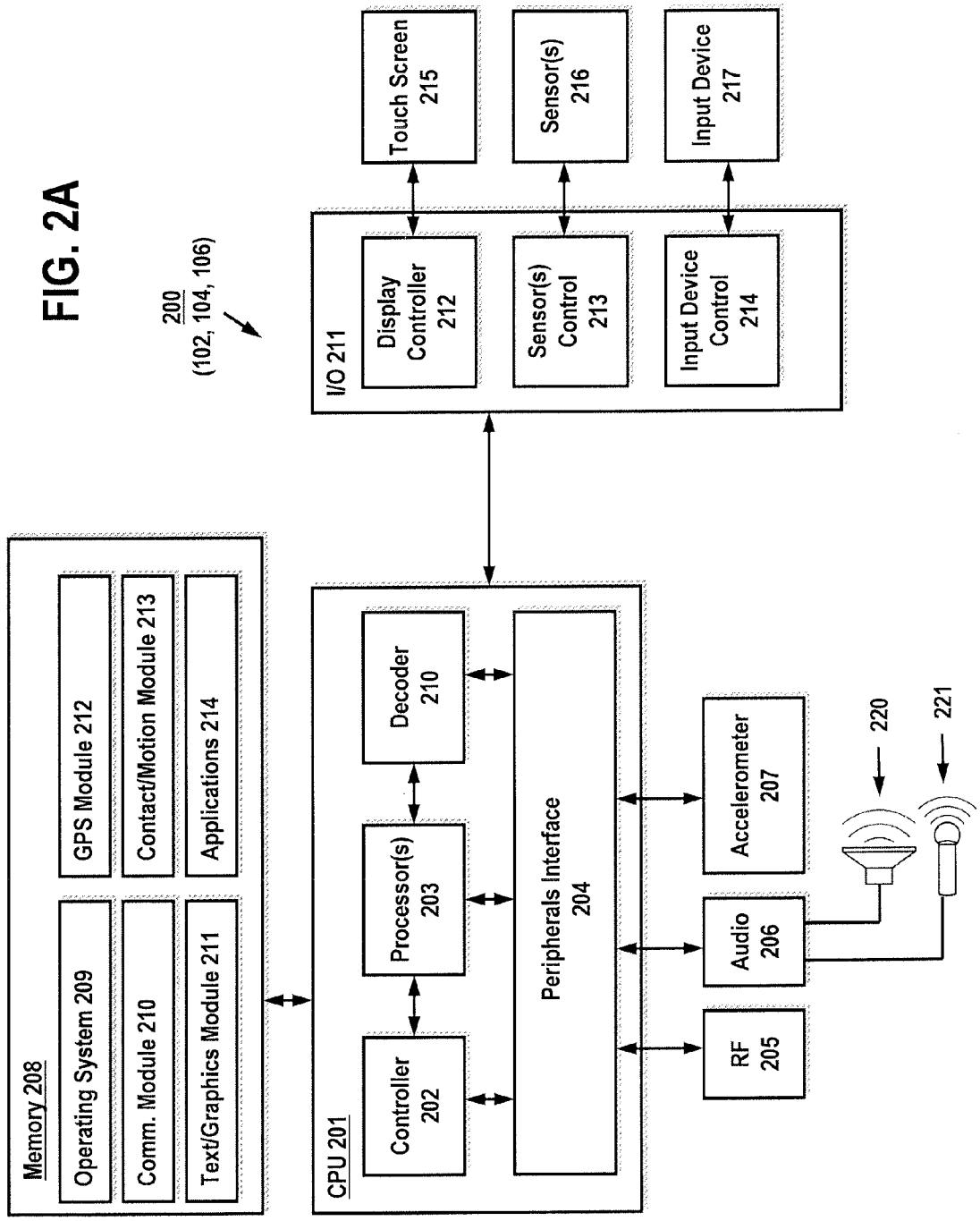
FIG. 2A is an exemplary mobile terminal portable computing device configured to provide monitoring capabilities on the device.

A mobile terminal as used herein comprises at least one wireless communications transceiver. Non-limiting examples of the transceivers include a GSM (Global System for Mobile Communications) transceiver, a GPRS (General Packet Radio Service) transceiver, an EDGE (Enhanced Data rates for Global Evolution) transceiver, a UMTS (Universal Mobile Telecommunications System) transceiver, a WCDMA (wideband code division multiple access) transceiver, a PDC (Personal Digital Cellular) transceiver, a PHS (Personal Handy-phone System) transceiver, and a WLAN (Wireless LAN, wireless local area network) transceiver. The transceiver may be such that it is configured to co-operate with a predetermined communications network (infrastructure), such as the transceivers listed above. The network may further connect to other networks and provide versatile switching means for establishing circuit switched and/or packet switched connections between the two end points. Additionally, the device may include a wireless transceiver such as a Bluetooth adapter meant for peer-to-peer communication and piconet/scatternet use. Furthermore, the terminal may include interface(s) for wired connections and associated communication relative to external entities, such as an USB (Universal Serial Bus) interface or a Firewire interface.

As will be explained in further detail below, mobile terminal events may be monitored, where the events may include, for example, substantially non-user-initiated incidents such as battery status change, not at least directly initiated by the user of the device. The actions may include substantially user-initiated intentional activities and incidents, for example use of the web browser, movements, reading a message, etc. Some incidents may be also considered to conveniently fit both the above incident classes.

Embodiments of the mobile terminal further apply different triggers and preferably also smart algorithms that coordinate performing observations and/or data transmissions. For example, when the user places a voice call, this can be used to trigger an automatic observation of the location (e.g. via GPS) which may automatically trigger a poll on base station tower information, after which an automatic data transmission may take place. Consequently a server side may be provided with near to real-time knowledge about each user's recent communication activities. The triggers can be based on hard-coded known dynamics, such as base station changes (that typically reflect movements if they happen frequently), or alternatively on self-learning, adaptive logic, or both. For example, an intelligence engine for a mobile terminal may be configured to recognize patterns that occur on a regular basis, such as updating calendar entries at specific times and the like, prompting a smart rule for checking calendar content at a time interval afterwards.

Observation logic is preferably tied natively to the mobile device without using middle layer platforms, which allows for more direct observations, smarter logic, better access to platform stable process, and little intervention in other processes. It is understood that other configurations, which may include middle layer platforms, are possible as well in the present disclosure. When tied natively, observation logic is also preferably enabled to pre-process observation data on a raw-level format, which may refer to the verification of a data point's validity, dropping duplicate observations, calculating indices (averages), normalizing observations, and/or other ways making the data flow smoother, optimized (volume-wise) or more reliable. Data conversion and pre-processing part of the observation logic may also be configured to utilize feedback from remote entities, and overall intelligence, which might be linked to contextual factors as well. Thus, in one embodiment the observation logic may be configured to utilize the input by external entities such as a server. As an example, the input may comprise intelligence provided by an external entities such as weather conditions, cellular network topology, and/or activities of the social network in the form of rules, for example, whereupon the mobile terminal may be configured to apply such input to improve and update the operations of the observation logic. As a further example, a data input module and/or data handling agent may be utilized in providing the instructions, being locally generated and/or received from external entities, to the observation logic.

In any event, observation logic is preferably enabled herein to conduct active monitoring (observations), such as scanning device memory or available Bluetooth connections for data. Under this embodiment, active observations are substantially done on the basis of active triggers and consequent observations done via device APIs. Additionally, the observation logic supports passive observations, which are based on sensing an observation environment, and may be induced by change(s) in the observation environment. These changes may be traced through an operating system's APIs to a data point for subsequent storage. Low-level device interfaces can be registered accordingly so that when a change happens, an observation is recorded.

For example, upon recognizing that an active base station has changed, an associated observation can be made so that the details of the base station with all the necessary parameters (e.g., signal strength and timing advance) will be scanned. Accordingly, a related data point may be written into the log. The observation logic may collect data points based on communication actions such as initiating a call, answering a call, sending a message such as an SMS (Short Message Service), MMS (Multimedia Message Service), or e-mail message, receiving a corresponding message, etc.), sensor data (e.g. temperature, acceleration, position (orientation and/or location via e.g. GPS/cell identification/triangulation), light intensity), application usage, microphone usage, loudspeaker/audio output such as music reproduction, camera usage, any user input or action in general, calendar entries (additions/deletions and/or actual realization/activation thereof), and in principle the observations can range from simple temperature-type logging to all-day audio and video recordings, for instance, which are automatically observed (recorded) in the device.

The mobile terminal preferably supports multi-thread observation logic, where each observation is done as a separate process, and without intervening with other processes of other applications. In such cases, problems in reading data and consequent crashes of a specific thread will have a minimal impact on other applications. Conducting observations is guided by the aforementioned intelligent triggering logic, preferably customizing observations based on the nature and/or importance (priority ranking) of the data point, contextual factors, external input, and/or existing technical restrictions.

The various embodiments of a mobile terminal disclosed herein (also referred to as a "processing device") preferably include logic for intelligent pre-processing and/or filtering of life feed data locally. Particularly when the amount of life feed data observed from device APIs is considerable, the ability to filter out irrelevant data is advantageous. The filtering logic, data handling logic in general and thus the overall intelligence of the terminal may be advantageously functionally linked to the server-side environment in order to obtain instructions to facilitate, for example, the update of locally applied rules and algorithms, and offering benefits arising from the availability of wider datasets in the server environment (for instance, in recognizing patterns). Depending on the embodiment, the mobile terminal may thus be self-learning, adaptive, and/or incorporates input from the server-side intelligence repository. The mobile terminal may specifically include the aforementioned data input module for obtaining the external input.

Preferably, the mobile terminal is configured to push the data towards servers at appropriate time instants. For example, the intelligence engine of the terminal, which may spread between several functional entities of the terminal such as observation logic (observation intelligence engine) and data handling agent (mobile intelligence engine), may determine the optimal time to transmit processed data from devices to server(s). The intelligence may be implemented using contextual triggers (e.g. location changes), behavioral triggers (e.g. user's actions), time limits (e.g. regular transmission), emergency condition (for instance, when fire observed in the proximity of the phone), cost-efficiency (transmitting after a certain threshold of data is collected to local memory, limiting the costs of transmission) and battery-optimization (saving as much of the battery as possible). The intelligence engine is preferably capable of learning from the collected data, observed patterns, and/or input from external entities such as servers, and adapt to contextual dimensions as well.

In one embodiment, a data handling agent mainly coordinates the data flow output through the observation logic, thus maintaining the overall agent-side intelligence of the system logic, and transmits the observed data to one or more servers. The data handling agent is preferably capable of streamlining and filtering data by the data observation logic, combining data points (adding, for example, active cellular base stations indices to battery level changes), enriching data (for example, adding temperature to obtained GPS coordinates) and/or in other ways converting the stream of data into a more meaningful and richer information flow. In addition, a data handling agent may maintain an intelligence repository as part of a mobile intelligence engine in order to enable more efficient rules for conducting, organizing, processing and transmitting data. An observation intelligence engine may control what, how and when to conduct observations on the mobile agent side. The mobile intelligence engine may also receive input from the external entity such as a server module through one or more data input APIs.

For example, the status of the user's friends can be provided by a server, which is optionally configured to activate a more frequent location retrieving in the terminal, and observation logic thereof, provided that the user and his friend are approaching the same location and thereby indicating a high likelihood that they may meet at or near a particular point. The data handling agent is preferably enabled to store the observation data stream and intelligence data in a local memory for temporary storage. The data handling agent also performs data transmission, which optionally may involve authentication, encryption and/or other type of securing the data streams and connections. Data transmission for the logic of the data handling agent may be based on triggers and adaptive rules that make it flexible and adjustable to different situations and use cases. The data handling agent may interact with the user interface of the device, for example in mapping subjective information or semantic data asked directly from the users to observations.

In the embodiments of a mobile terminal, one or more data input modules may be used for receiving data from external entities such as a server side. In one embodiment, a data input is automatically started when the connection is open towards the server (i.e. when data transmission triggered towards the server takes place). It may, however, operate independently. The data input module may have a processing logic of its own to categorize and process the received data, and optimally inform the data handling agent about it. For example, simple contextual parameters like temperature might be directly stored in a temporal cache memory to be used by a data handling agent for enriching observations, but on the other hand intelligence rules (such as the fact that in the current operator's network the frequency of network tower polling should be 50% more frequent in daytime) will be incorporated in the set of rules making up the intelligence logic of the mobile agent. Such intelligence logic may be maintained by the data handling agent and optionally the observation logic for subsequent processing. The data input module is also responsible for managing and transmitting to the data handling agent a variety of intelligent messages that need to be pushed to the user interface of the wireless device, ranging from geo-social advertisements to contextual notifications from other wireless devices.

In a preferred embodiment, the server arrangement is configured to mutually link observation data points relative to users, locations, contexts, weather and/or any other information. Data aggregation may take place in each mobile terminal as described above. In another embodiment, the server arrangement utilizes gradual aggregation and temporal resolution adjustment for obtained data such that the most current data is very granular and accurate, while later data may be optimized for data storage. For example, in instances when limited location points are stored for a number of monitored days, a weighted average of geo-locations may be used for the time period instead. The server arrangement may also maintain lists in a further, supplementary or alternative, embodiment the server arrangement maintains, or has at least access to, a social contact (e.g. friends) database indicative of the existing social connections between the users of the mobile terminals.

The server side entity of the present invention is unique in the sense that it incorporates collective data for all devices being connected to the system in contrast to the end-to-end pipelines of prior art. Other advantageous functionalities of the server include bridging external data (for example, weather or traffic information) to device-based data and use of cumulative wisdom from all the possible data points and external APIs in optimizing the internal rules and processes (the intelligence), and also transforming and providing these improved rules to mobile terminals for use in local observation tasks and related local intelligence. In addition, novel functionalities of the server preferably include pull and/or push mode data distribution APIs that facilitate distribution of multi-dimensional data to external systems and mobile terminals, without specifying these use cases or doing unnecessary assumptions beforehand (the typical shortcoming in prior art solutions).

The server arrangement may reside in the intersection of the social networks, external environmental data, specific behavioral and contextual data provided by the mobile devices, and overall intelligence embodied on tangible mediums provided by, e.g., algorithms, data aggregation and mining procedures, pattern recognition, semantic structures, etc. It may be configured to enrich the data, update statistical averages, build cumulative databases, make observations across individuals (for example to identify two users' proximity), make predictions by relying on the amount data, and utilizing statistical processing to calculate likelihood estimates for different outcomes to happen. The server side intelligence may incorporate, depending on the embodiment, intelligent functionalities such as suggestions of advertisements to specific users, to be sent by these users to other users of their social networks. For example, an individual user entering a restaurant can be informed of a happy hour discount for beer in a local bar, and the system suggests to the user the related ad to be sent to one of his friends (thereby leading potentially to a meeting between the friends in the local bar), also located in the neighborhood. This advertisement, which may be received by a friend through a viral path, is an intentional message from one of his friends or business contacts, not a disturbing pop-up push-mode message by a practically unknown third party as being the case in most prior art solutions for targeted mobile advertising. Thanks to the feedback loop to the mobile agents, these kinds of smart, context-dependent social advertisements can be implemented together.

The aforementioned analytics and data processing logic may be implemented as a software module embodied on a tangible medium, which acts as a centralized location wherein all external APIs' data (e.g. names of locations, temperatures), device-based data and social network data can be conceptually brought together. An intelligence engine of the server, which may be spread among several entities (into centralized intelligence engine and API intelligence engine, for instance), coordinates the operations, maintains the set of rules, a sub-set of which will also be sent to mobile agents through the data distribution logic such as a data distribution API, and its internal interface. Centralized and API intelligence engines are preferably adaptive and self-learning, coming up with patterns or other insights regarding, for example, the topology and cellular tower locations of a particular operator's network. A data management module may be applied to maintain the enriched, modified and processed data outputted by enrichment and processing module, which streamlines all the information received, preferably adding semantic dimensions, etc. The data management module may therefore administer vast clusters of databases or database servers, in which all the data (observations, other information, intelligence rules) are stored preferably in a scalable way, the resolution of data stored being gradually narrowed temporally for historical life feed data as mentioned earlier. A data provisioning module may be provided to query the databases in an optimal way, when the need arises, and feed information further to the data distribution API for output.

Various embodiments disclosed herein may facilitate generating a life feed, reflecting real life, relevant data being collected from the true point of presence and end-user inspiration—the mobile terminal. Thus a mobile terminal may be configured to conduct various observations (monitoring) and handle pre-processing and forwarding thereof. The obtained life feed is preferably multi-dimensional, data points thereof following each other (time-series temporal nature), context-linked and context-aware (e.g. time, status and location), ubiquitous (everywhere, all the time), seamless and automatically created from the user's standpoint. The Various post-processing methods, analysis intelligence, self-learning aspect (e.g. self-learning triggers) and/or adaptive logic may be integrated as a result.

Automatic observation logic may be arranged in the mobile terminal to run on the background as intelligently triggered and mostly passively with minimum battery consumption and capacity usage, but still with comprehensive data acquisition capability relative to the relevant data points regarding the data associated with a user's life. The observation logic is advantageously completely context-sensitive, predictive and capable of learning from historical data. The collected data points in the mobile phone may be then converted into a life feed, which refers herein to a continuous stream of data points reflecting the timeline of associated people's life.

Further, the disclosure herein presents a novel way of aggregating, combining, enriching and/or analyzing datasets in a centralized environment, bringing an advantageous collective view on the life feed data, and facilitating further coordinated use of the data. Accordingly, a centralized server-side aspect of the present disclosure is enabled to intelligently process the data (for example, to perform data filtering or clustering), enrich it (for example, to add location names to geo-coordinates), analyze it, e.g. via contextual pattern recognition, build collective real-time intelligence, e.g. via understanding when any two people are actually approaching the same location, and/or to provide the obtained information to external systems with an application programming interface that may be queried on regular intervals and/or dynamically based on separate triggers. In addition, the centralized server-side logic facilitates creating new applications, such as socio-contextual advertising, pushing targeted advertisements to people via their friends' devices, and utilizing intelligent pop-ups in devices as a method of frequent interaction with users. In brief, automated and optimized life observation logic with server-side data processing and integrated application programming interface is provided for data distribution. A specific data distribution API may enable versatile exploitation of the observation data by having access to raw-level data items and being configured to streamline raw-level data points to more focused information data points. The distribution layer supports not only static data (such as personal profiles), or dynamic status data (such as current location), but also multi-dimensional time-variant data, which are herein referred to as life feeds.

A further advantageous feature is that the system does not take a stand on the use of the obtained data. The data distribution API of the server arrangement preferably defines the optimal, comprehensive structures for the whole data intelligence (the highest level of sophistication in the data repository, the information points derived from raw-level data points through several procedures), that can be rapidly accessed when looking for specific data points. The API may be self-learning and adaptive, for example sorting the most highly requested data points to the top, and predicting the data consumption and production unbalances, being able to inform about such important properties of data such as accuracy, validity, and/or consistency. For example, certain location points might have lower resolution and others, and certain status information points might be time-wise non-current. On top of the whole architecture, the data distribution API thus lets a set of external (and internal) modules access the data in a ubiquitous and universal way. Additionally, the users can set their privacy levels and data coordination policies centrally in the server arrangement. Data distribution procedures preferably operate under the rules, restrictions and options set by the user, verifying for each query to which platform the data is flowing, and what the nature, privacy settings and type of the data point is.

Turning to FIG. 1, an exemplary system architecture is illustrated. The exemplary system is divided into two parts, namely a mobile agent part executed in one or more mobile terminals 102, 104, 106 of respective users and a server arrangement part 112 comprising one or more server devices (112a, 112b) functionally arranged so as to establish a server entity. Devices 102-106 are configured to monitor device and data use by their respective users in accordance with the principles set forth herein. Server 112 is typically connected to a communications network 110 whereto also the mobile terminals 102, 104, 106 are provided with access, e.g. via one or more access networks 108a, 108b, which may be cellular or wireless local area networks, for instance. External entities 114 such as services/servers (114a, 114b) may be connected to the server arrangement 112 via the network 110 for obtaining observation data and further data derived therefrom and/or for providing supplementary data such as weather information.

FIG. 2A is an exemplary embodiment of a portable computing device 200 which may function as a mobile terminal (see references 102, 104 and 106 of FIG. 1), and may be a smart phone, tablet computer, or the like. Device 200 may include a central processing unit (CPU) 201 (which may include one or more computer readable storage mediums), a memory controller 202, one or more processors 203, a peripherals interface 204, RF circuitry 205, audio circuitry 206, a speaker 220, a microphone 220, and an input/output (I/O) subsystem 211 having display controller 212, control circuitry for one or more sensors 213 and input device control 214. These components may communicate over one or more communication buses or signal lines in device 200. It should be appreciated that device 200 is only one example of a portable multifunction device 200, and that device 200 may have more or fewer components than shown, may combine two or more components, or a may have a different configuration or arrangement of the components. The various components shown in FIG. 2A may be implemented in hardware or a combination of hardware and software, including one or more signal processing and/or application specific integrated circuits.

In one embodiment, decoder 210 serves to decode ancillary data embedded in audio signals in order to detect exposure to media. Examples of techniques for encoding and decoding such ancillary data are disclosed in U.S. Pat. No. 6,871,180, titled "Decoding of Information in Audio Signals," issued Mar. 22, 2005, and is incorporated by reference in its entirety herein. Other suitable techniques for encoding data in audio data are disclosed in U.S. Pat. No. 7,640,141 to Ronald S. Kolessar and U.S. Pat. No. 5,764,763 to James M. Jensen, et al., which are incorporated by reference in their entirety herein. Other appropriate encoding techniques are disclosed in U.S. Pat. No. 5,579,124 to Aijala, et al., U.S. Pat. Nos. 5,574,962, 5,581,800 and 5,787,334 to Fardeau, et al., and U.S. Pat. No. 5,450,490 to Jensen, et al., each of which is assigned to the assignee of the present application and all of which are incorporated herein by reference in their entirety.

An audio signal which may be encoded with a plurality of code symbols is received at microphone 221, or via a direct link through audio circuitry 206. The received audio signal may be from streaming media, broadcast, otherwise communicated signal, or a signal reproduced from storage in a device. It may be a direct coupled or an acoustically coupled signal. From the following description in connection with the accompanying drawings, it will be appreciated that decoder 210 is capable of detecting codes in addition to those arranged in the formats disclosed hereinabove.

Alternately or in addition, processor(s) 203 can processes the frequency-domain audio data to extract a signature therefrom, i.e., data expressing information inherent to an audio signal, for use in identifying the audio signal or obtaining other information concerning the audio signal (such as a source or distribution path thereof). Suitable techniques for extracting signatures include those disclosed in U.S. Pat. No. 5,612,729 to Ellis, et al. and in U.S. Pat. No. 4,739,398 to Thomas, et al., both of which are incorporated herein by reference in their entireties. Still other suitable techniques are the subject of U.S. Pat. No. 2,662,168 to Scherbatskoy, U.S. Pat. No. 3,919,479 to Moon, et al., U.S. Pat. No. 4,697,209 to Kiewit, et al., U.S. Pat. No. 4,677,466 to Lert, et al., U.S. Pat. No. 5,512,933 to Wheatley, et al., U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,551 to Kenyon, et al., U.S. Pat. No. 4,230,990 to Lert, et al., U.S. Pat. No. 5,594,934 to Lu, et al., European Published Patent Application EP 0887958 to Bichsel, PCT Publication WO02/11123 to Wang, et al. and PCT publication WO91/11062 to Young, et al., all of which are incorporated herein by reference in their entireties. As discussed above, the code detection and/or signature extraction serve to identify and determine media exposure for the user of device 200.

Memory 208 may include high-speed random access memory (RAM) and may also include non-volatile memory, such as one or more magnetic disk storage devices, flash memory devices, or other non-volatile solid-state memory devices. Access to memory 208 by other components of the device 200, such as processor 203, decoder 210 and peripherals interface 204, may be controlled by the memory controller 202. Peripherals interface 204 couples the input and output peripherals of the device to the processor 203 and memory 208. The one or more processors 203 run or execute various software programs and/or sets of instructions stored in memory 208 to perform various functions for the device 200 and to process data. In some embodiments, the peripherals interface 204, processor(s) 203, decoder 210 and memory controller 202 may be implemented on a single chip, such as a chip 201. In some other embodiments, they may be implemented on separate chips.

The RF (radio frequency) circuitry 205 receives and sends RF signals, also called electromagnetic signals. The RF circuitry 205 converts electrical signals to/from electromagnetic signals and communicates with communications networks and other communications devices via the electromagnetic signals. The RF circuitry 205 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 205 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 206, speaker 220, and microphone 221 provide an audio interface between a user and the device 200. Audio circuitry 206 may receive audio data from the peripherals interface 204, converts the audio data to an electrical signal, and transmits the electrical signal to speaker 220. The speaker 220 converts the electrical signal to human-audible sound waves. Audio circuitry 106 also receives electrical signals converted by the microphone 221 from sound waves, which may include encoded audio, described above. The audio circuitry 206 converts the electrical signal to audio data and transmits the audio data to the peripherals interface 204 for processing. Audio data may be retrieved from and/or transmitted to memory 208 and/or the RF circuitry 205 by peripherals interface 204. In some embodiments, audio circuitry 206 also includes a headset jack for providing an interface between the audio circuitry 206 and removable audio input/output peripherals, such as output-only headphones or a headset with both output (e.g., a headphone for one or both ears) and input (e.g., a microphone).

I/O subsystem 211 couples input/output peripherals on the device 200, such as touch screen 215 and other input/control devices 217, to the peripherals interface 204. The I/O subsystem 211 may include a display controller 112 and one or more input controllers 214 for other input or control devices. The one or more input controllers 214 receive/send electrical signals from/to other input or control devices 217. The other input/control devices 217 may include physical buttons (e.g., push buttons, rocker buttons, etc.), dials, slider switches, joysticks, click wheels, and so forth. In some alternate embodiments, input controller(s) 214 may be coupled to any (or none) of the following: a keyboard, infrared port, USB port, and a pointer device such as a mouse, an up/down button for volume control of the speaker 220 and/or the microphone 221. Touch screen 215 may also be used to implement virtual or soft buttons and one or more soft keyboards.

Touch screen 215 provides an input interface and an output interface between the device and a user. The display controller 212 receives and/or sends electrical signals from/to the touch screen 215. Touch screen 215 displays visual output to the user. The visual output may include graphics, text, icons, video, and any combination thereof (collectively termed "graphics"). In some embodiments, some or all of the visual output may correspond to user-interface objects. Touch screen 215 has a touch-sensitive surface, sensor or set of sensors that accepts input from the user based on haptic and/or tactile contact. Touch screen 215 and display controller 212 (along with any associated modules and/or sets of instructions in memory 108) detect contact (and any movement or breaking of the contact) on the touch screen 215 and converts the detected contact into interaction with user-interface objects (e.g., one or more soft keys, icons, web pages or images) that are displayed on the touch screen. In an exemplary embodiment, a point of contact between a touch screen 215 and the user corresponds to a finger of the user. Touch screen 215 may use LCD (liquid crystal display) technology, or LPD (light emitting polymer display) technology, although other display technologies may be used in other embodiments. Touch screen 215 and display controller 212 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 212.

Device 200 may also include one or more sensors 216 such as optical sensors that comprise charge-coupled device (CCD) or complementary metal-oxide semiconductor (CMOS) phototransistors. The optical sensor may capture still images or video, where the sensor is operated in conjunction with touch screen display 215. Device 200 may also include one or more accelerometers 207, which may be operatively coupled to peripherals interface 204. Alternately, the accelerometer 207 may be coupled to an input controller 214 in the I/O subsystem 211. The accelerometer is preferably configured to output accelerometer data in the x, y, and z axes.

In some embodiments, the software components stored in memory 208 may include an operating system 209, a communication module 210, a contact/motion module 213, a text/graphics module 211, a Global Positioning System (GPS) module 212, and applications 214. Operating system 209 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 210 facilitates communication with other devices over one or more external ports and also includes various software components for handling data received by the RF circuitry 205. An external port (e.g., Universal Serial Bus (USB), Firewire, etc.) may be provided and adapted for coupling directly to other devices or indirectly over a network (e.g., the Internet, wireless LAN, etc.

Contact/motion module 213 may detect contact with the touch screen 215 (in conjunction with the display controller 212) and other touch sensitive devices (e.g., a touchpad or physical click wheel). The contact/motion module 213 includes various software components for performing various operations related to detection of contact, such as determining if contact has occurred, determining if there is movement of the contact and tracking the movement across the touch screen 215, and determining if the contact has been broken (i.e., if the contact has ceased). Text/graphics module 211 includes various known software components for rendering and displaying graphics on the touch screen 215, including components for changing the intensity of graphics that are displayed. As used herein, the term "graphics" includes any object that can be displayed to a user, including without limitation text, web pages, icons (such as user-interface objects including soft keys), digital images, videos, animations and the like. Additionally, soft keyboards may be provided for entering text in various applications requiring text input. GPS module 212 determines the location of the device and provides this information for use in various applications. Applications 214 may include various modules, including address books/contact list, email, instant messaging, video conferencing, media player, widgets, instant messaging, camera/image management, and the like. Examples of other applications include word processing applications, JAVA-enabled applications, encryption, digital rights management, voice recognition, and voice replication.

Server arrangement 260 of FIG. 2B may comprise one or more computer devices 261 comprising a communications interface 254 such as a LAN (Local Area Network) adapter, e.g. Ethernet adapter, a processing entity such as at least one processor 250 for processing data, a memory 252 for storing data, server side software architecture 258 and UI 256.

Figure 3:
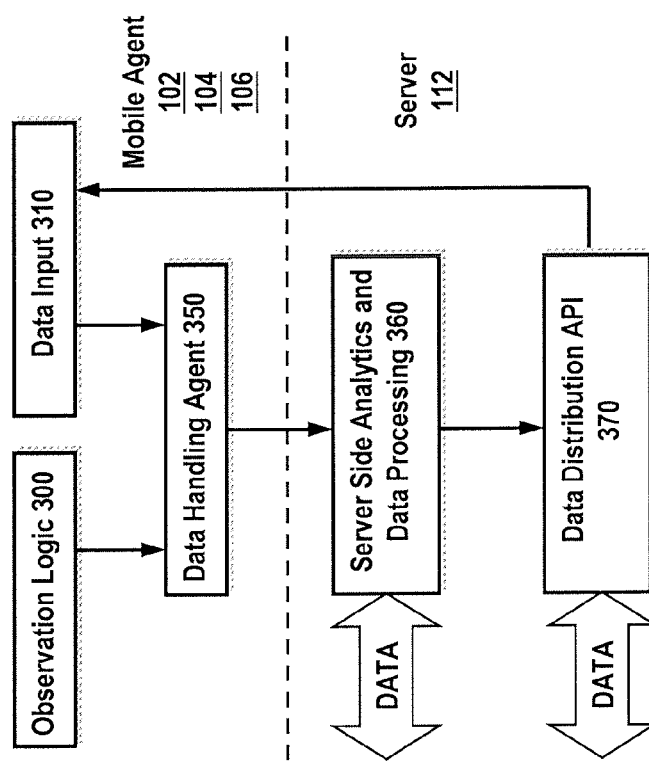
FIG. 3 is an exemplary flow diagram for communication between a mobile terminal and server arrangement under one embodiment.

FIG. 3 represents a flow diagram of one embodiment of the system incorporating both a mobile agent and a server arrangement. One function of the agent is to observe events, actions and/or properties in the wireless devices via observation logic 300, and to perform pre-processing for the observed data and manage the device-based intelligence regarding data handling via handling agent 350. In addition, the agent is enabled, by the data input module 310, to receive data from a server, where the data may include such items as metadata, contextual data, and/or updates regarding data handling rules and observation requirements. Data input module 310 may also be used for inputting new observation code and modules, which can be incorporated in the agent software logic over-the-air. The responsibility of the data handling agent 350 is generally to coordinate the operations of the observers, maintain and control the overall intelligence, coordinate data storing and transmission, and preferably update the intelligence (via learning and adaptation) on the agent side. The data handling agent may also be implemented as a server process in the agent, serving multiple clients such as different observers.

On the server side (112), the data that is transmitted is processed (filtered, enriched, combined, analyzed, and/or normalized, and so on), in the server-side analytics and data processing module 360. Module 360 preferably serves in a central role, being able to use not only the information from devices, but also externally available data, such as temperatures and location names. In addition, the server is able to apply collective intelligence on the data, for instance, to automatically and seamlessly to identify relationships between data points. The server may observe that two friends are located next to each other provided that each of them sends a location update from close to each other at approximately same time, for instance. As one particularly advantageous feature, the server deploys intelligent algorithms making sense out of the multi-dimensional, geographical, social, contextual and/or behavioral datasets that it handles in its relational (and in many cases semantic) databases.

The whole system has been designed efficiently so that the server is more than just a cache, and implements a centralized intelligence engine coordinating the operations of the aggregate system, the clients of which being able to utilize its collective intelligence through two-way communication protocols and their own adaptive and learning logic. A data distribution API 370 is also located on the server side. It advantageously serves as a simultaneous starting and ending point of the data flow, i.e. providing access to internal and external interfaces for query data. This API is flexible as it not only provides simple one-dimensional status information, but can provide a stream of activities as well. For example, one potential query might be to provide a list of movement activities during the last seven day in the New York Manhattan area, during which the temperature has been higher than 30 degrees Celsius, and at least one of the user's friends has been in the radius of five kilometers. In contrast to conventional arrangements, the system disclosed herein does not necessarily require fixed data pipe-lines or interfaces, but instead builds the logic on top of a flexible multi-use data distribution API.

Figure 4:
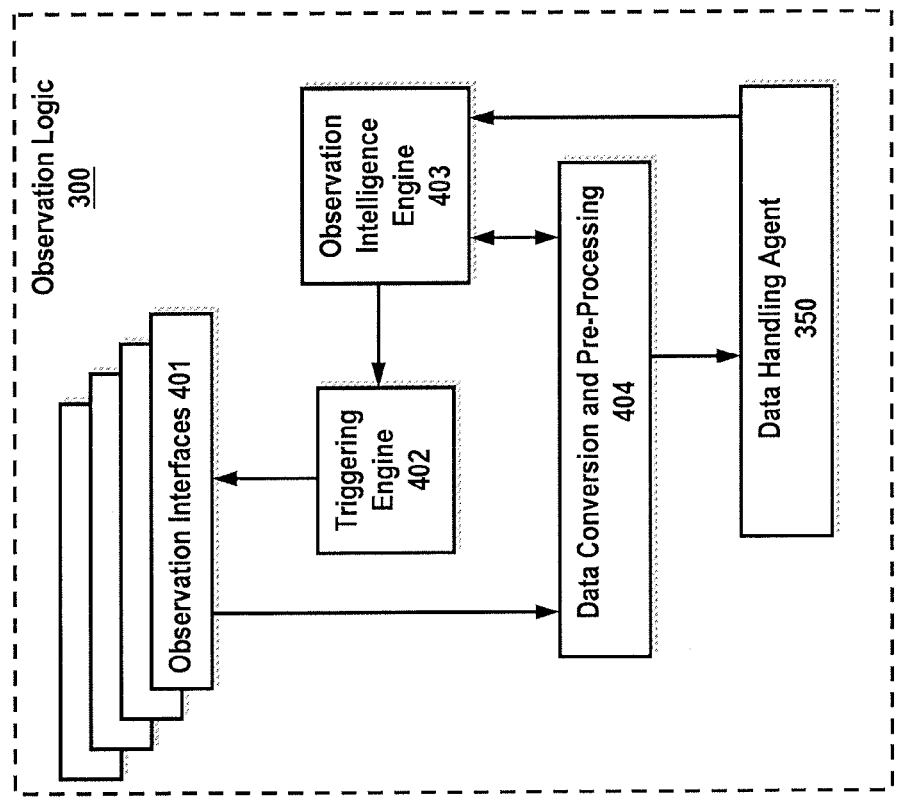
FIG. 4 is an exemplary flow diagram of one embodiment of observation logic in a mobile terminal.

In FIG. 4, an embodiment of data observation logic 300 is illustrated. A number of observation interfaces 401 handle the monitored observations, determine the context, activities and device information, and stream the data to the data conversion and pre-processing layer 404, which is then configured to perform desired raw-level data conversions and processing activities on the data. For example, it may convert pure observations into more informative and easier-to-handle standardized XML format. The triggering engine 402 coordinates observations by optimally triggering the sensors. The observation intelligence engine 403 receives external data (e.g. from the server-side, directed by the mobile intelligence engine 553), maintaining the rules of data observations and pre-processing, guiding the respective modules.

Figure 5:
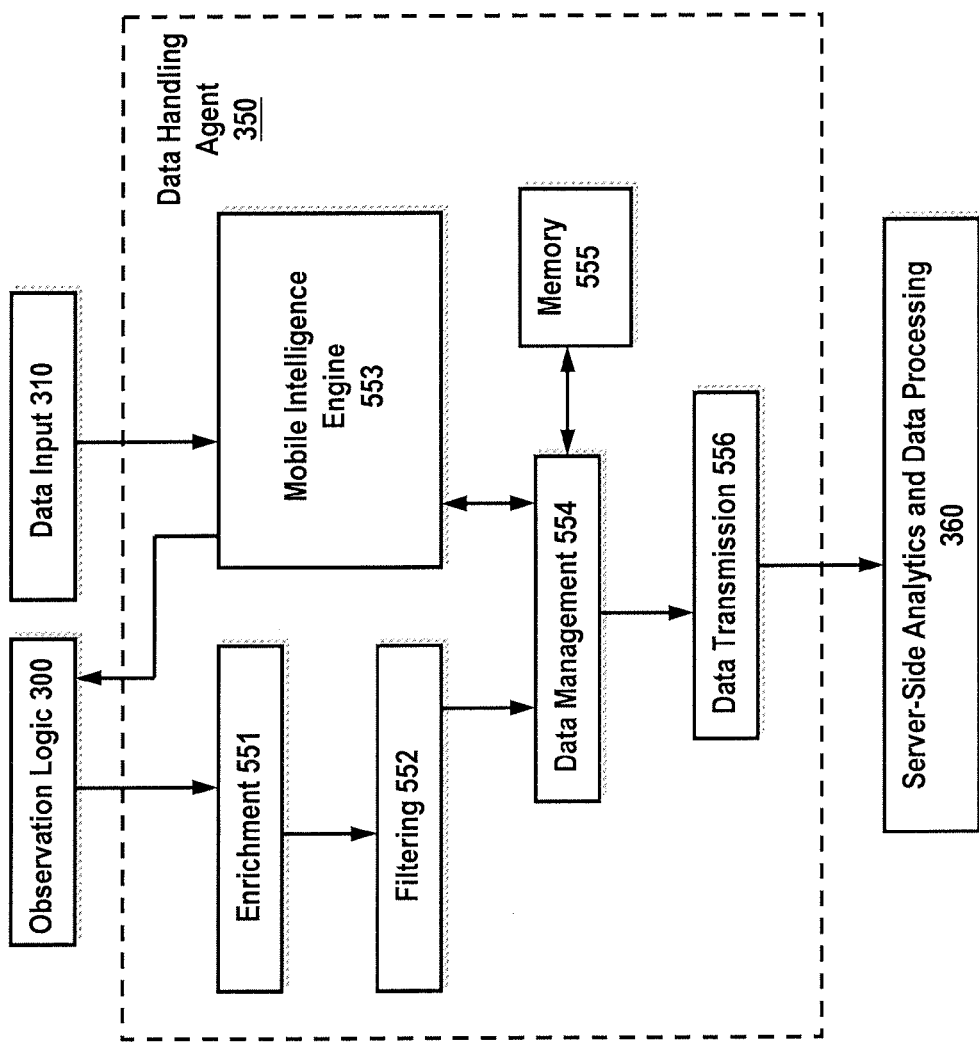
FIG. 5 is an exemplary flow diagram of one embodiment of a data handling agent in a mobile terminal.

With reference to FIG. 5, an embodiment of the data handling agent 350 is described. Data handling agent 350 may be configured to receive observation data from observation logic 300 through the enrichment module 351. XML and similar data coming from the mobile device may be enriched with other data points, such as the timestamp of a previous data point or identification codes and/or signal strengths of the currently active or all visible cell towers. Filtering logic 552 is next applied to data to remove redundant or useless data, and also sort and otherwise validate the data stream. Data management module 554 manages the data, including but not limited to data analysis. This module also coordinates locally storing the data in memory 555 and feeding it to data transmission module 556, and thus further towards the server 360. Data management module 554 also extracts information, processes the information to "learn" data patterns or other characteristics, and preferably feeds it substantially in real-time back to mobile intelligence engine 553, thus coordinating the agent side of the system. For example, it can be observed that active cellular tower identification codes are changing rapidly, meaning that the topology of the network at that point is very dense (tower-wise) or that the wireless device is moving. Mobile intelligence engine 553 can incorporate that information, and consequently coordinate the observation intelligence engine 403 of the observation engine to more frequently observe locations and movements. Mobile intelligence engine 553 may also coordinate optimal transmission of data through the data management layer. Data input module 310 receives data from the server-side and feeds it to the mobile intelligence engine 553.

Figure 6:
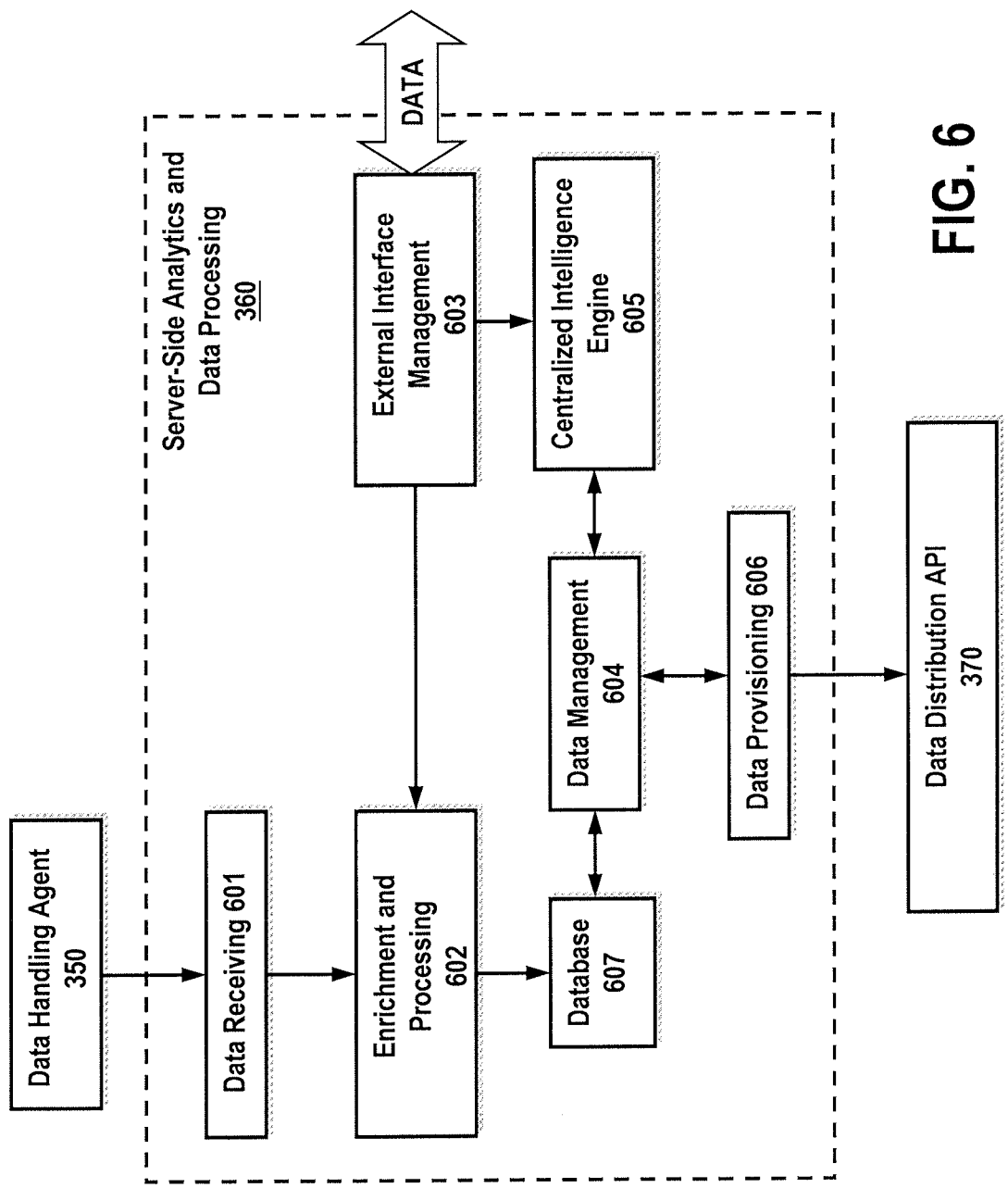
FIG. 6 is an exemplary flow diagram of one embodiment of server-side analytics and data processing logic.

In FIG. 6 an exemplary embodiment of the server-side analytics and data processing module 360 is illustrated. Data is received from the data handling agent 350 of the mobile terminal by the data receiving module 601. This module is preferably scalable and enabled to receive data points from multiple wireless devices at the same time. On the server-side is the data enrichment and processing layer 602, in which relevant, possibly contextual, processes are applied on the incoming data. This module may be configured to apply the external interface management module 603 in order to obtain information from outside, such as weather information supplied by weather data provider. The processed data is fed to the data management module 604 that stores the data into one or more databases 607 and maintains the database(s). This module is guided by the centralized intelligence engine 605 that can also incorporate information from external interfaces. Database 607 is intelligent and capable of holding more accurate and granular data for the most current data, and optimizing the storage of historical data by averaging statistics and decreasing the resolution, for example. Data provisioning layer 606 is enabled to feed data stored in the database(s) 604 to the data distribution API 370.

Figure 7:
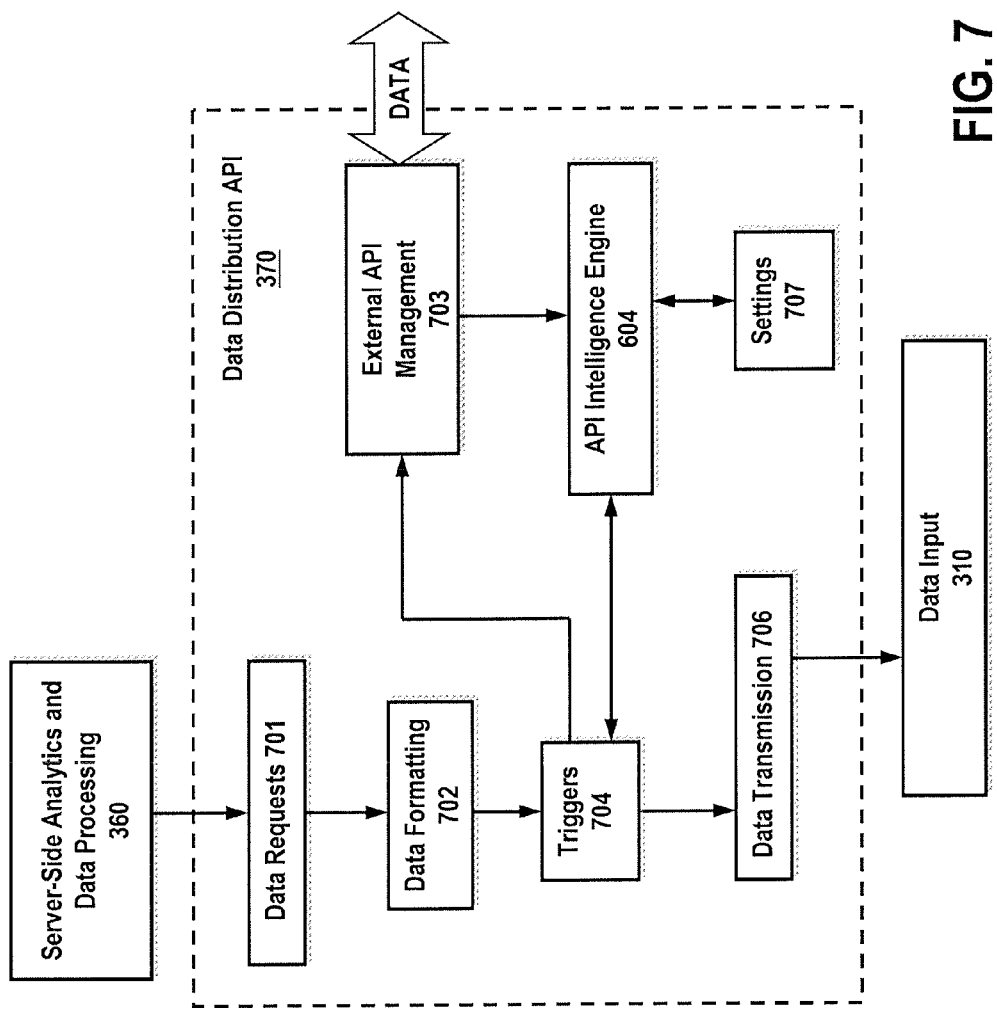
FIG. 7 is an exemplary flow diagram of a data distribution API under one embodiment.

In FIG. 7, an exemplary embodiment of the data distribution API 370 is depicted. Data request module 701 queries the databases and further directs the data to data formatting module 702 that is responsible for converting the data and changing it to the appropriate format. Triggering logic 704 is responsible for guiding the data transmission module 706 that eventually sends the data to the data input module 310 of the mobile terminals, and/or to external interfaces through the external API management module 703. This module is naturally of importance, as in many use cases data shall be provided to other services of the communication network. Indeed, the overall system described in this document is primarily designed for data collection, management, analysis and distribution functionalities. API intelligence engine 705 coordinates the operations of data distribution API 370, verifying, for example, user settings (privacy, data distribution guidelines) on the basis of a separate settings module 707 preferably when transmitting data. Accordingly, the configuration facilitates proper and efficient coordination of data possibly flowing from multiple devices (sources) to multiple use cases (targets; for example web services and physical devices) by the described centralized platform for data management.

Figure 8:
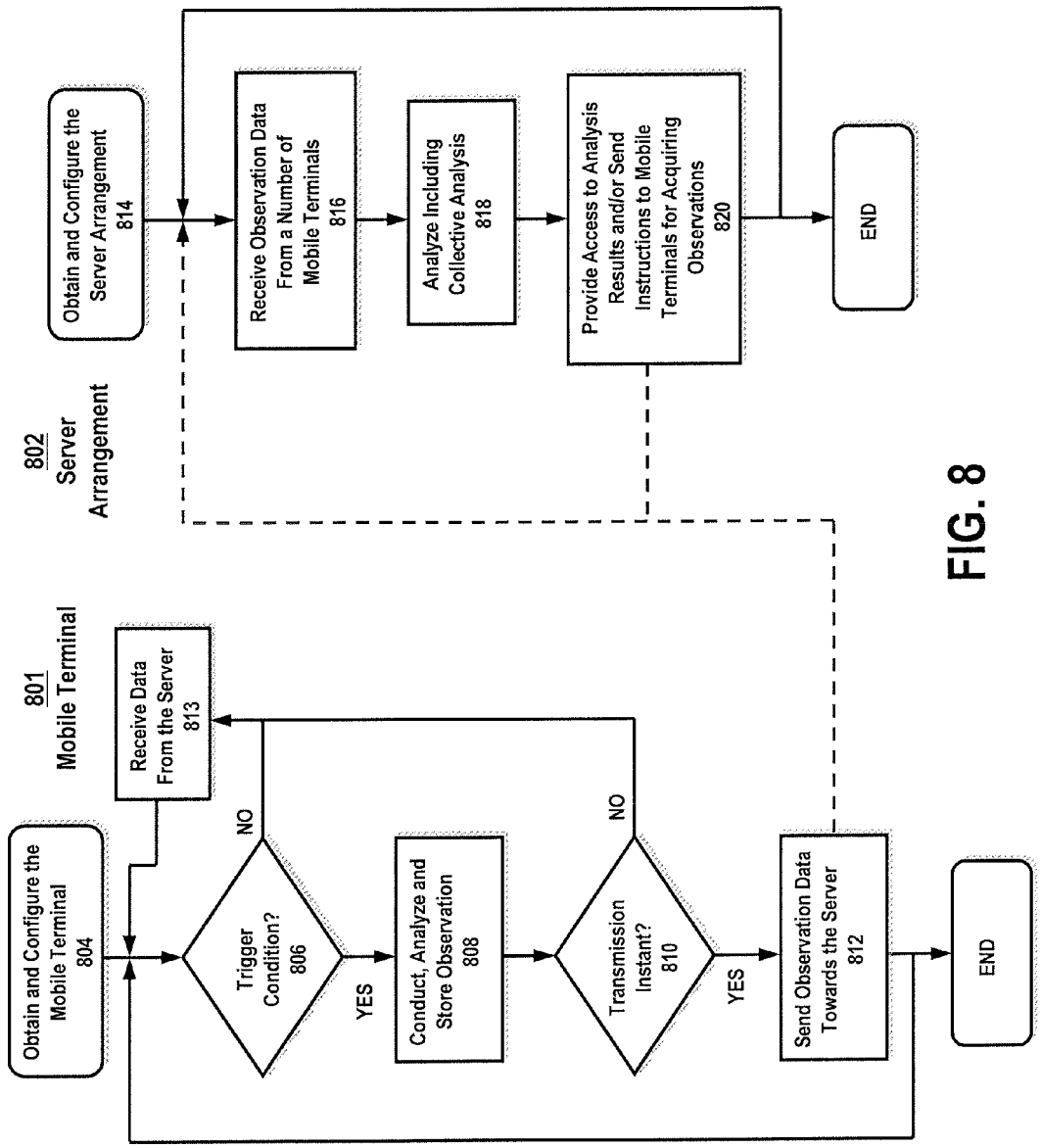
FIG. 8 is an exemplary composite flow diagram of embodiments for processes performed on a mobile terminal and a server arrangement, respectively.

FIG. 8 is a combined flow diagram of two exemplary embodiments directed to techniques performed by a mobile terminal and a server arrangement. On the left side 801 operations performed in the mobile terminal are illustrated whereas the right side process 802 depicts exemplary tasks of the server arrangement. Both entities may communicate with each other as highlighted by the broken arrows. Loop-back arrows depict the real-time nature of the configuration, i.e. the method steps may be executed repeatedly in a sequential or selective manner. At 804 a mobile terminal, such as a smartphone, capable of executing agent software disclosed herein is obtained and configured by acquiring the software ("mobile agent") and adjusting the settings thereof, for example. Existing active and passive triggers are served upon noticing a fulfillment of a triggering condition 806 by conducting 808 the associated observations, and further analyzing and storing the associated data. Upon a suitable time instant 810 the aggregated observation data are transmitted towards the server for further analysis, storage, feedback (for example, observation control) and/or distribution purposes. Step 813 illustrates the receipt of control data, e.g. control instructions, from the server for conducting the observations and/or related tasks such as data distribution.

At 814 the server arrangement is obtained and configured by acquiring the software and adjusting the settings thereof. Observation data is received 816 from a number of mobile terminals and analyzed 818 comprising both context and behavioral modeling, wherein the observation data by a plurality of mobile terminals is preferably collectively applied together with optional supplementary data. At 820, observations in the mobile terminals are conducted and may be adaptively guided by transmitting associated control data established on the basis of the analysis, e.g. triggering rules for active observations and/or event definitions for passive observations, towards one or mobile terminals. Also other external entities, such as servers, may be provided with access to analysis results. It is understood by those skilled in the art that the illustrated flow diagrams are merely exemplary and the nature and number of method steps, and the order thereof, may be dynamically adjusted based on the needs of the designer. More complex features of the embodiments are also contemplated within the context of the present disclosure.

The triggering logic mentioned above may actively or passively trigger observations. Passive triggers are tied to a certain event or action, which can be sensed and consequently the actual observation can be conducted and log entry written. Typical examples include observations associated with changing cellular towers, changing battery levels, and/or communication actions. In contrast to the prior art, the present disclosure provides triggering logic based on the number and/or frequency of sensor outputs. For instance, the actual observation(s) can be made after a certain number of cellular tower changes have been observed within a defined time limit. Below an exemplary pseudo-code representation is provided of the mentioned passive trigger that is based on the frequency of observed changes in a certain sensor "A":

Exemplary Code 1: Trigger based on changes/actions/events during a time cycle

```
RESET:
SET CHANGES = 0
SET PREVIOUS = 0
SET START = TIME
LOOP
    OBSERVE A
    IF A ≠ PREVIOUS
    CHANGES = CHANGES + 1
    IF (TIME-START) < THRESHOLD AND CHANGES > LIMIT
        TRIGGER_GO = 1
UNTIL (TIME-START) > THRESHOLD OR TRIGGER_GO = 1 IF
TRIGGER_GO = 1
THEN TRIGGER
GO TO RESET
```

Active triggers may be defined not as tied to the sensors, but based on fixed time limits and/or other triggering rules obtained from the server side or being user-defined. Another functionality of different embodiments is the observation logic, which is preferably passive and in a number of ways scalable, as each observation may be run in a separate thread, appearing as a client to the data handling agent 350. The overall software implementing the mobile agent is advantageously not a separate application that has to be specifically launched. Instead, it preferably loads itself to the memory when the device powers up and runs invisibly/transparently on the background ever since. It independently communicates with the server and starts new observers, collecting the data that they feed regarding behavioral and contextual observations. There are various kinds of observations that can be done, for example, including at least one element including, but not limited to:

1. Currently active cellular tower and/or all visible cell towers and their corresponding signal strengths (reflecting the current geographical location);
2. Voice calls and messages (e.g. outbound/inbound SMS, MMS, regular voice calls, emails etc);
3. Calendar appointments (meetings, notes, anniversaries etc.);
4. Application usage (web browser usage, calendar usage, camera usage);
5. Data sessions (opening the PDP (Packet Data Protocol) context, transferring data over Internet protocols);
6. Media consumption (music and video playback, streaming content from the Internet)
7. Battery status (status of the battery, i.e. how many bars there are left); and/or
8. Temperature (measured temperature inside/outside of the phone)

Another functionality of the embodiments is the device-based pre-processing. Outlier filtering procedures, data conversions such as conversions from raw hexadecimal observations to the standardized XML Unicode feed, factor analysis, weighted averaging and/or other such methods may be applied in certain situations in the mobile agent. More specifically, locally available information may be matched to data points, a good example being the attachment of time stamps and/or currently active cellular tower identification codes to the data points. By doing this in advance on the mobile side, the load and complexity of the server-side is minimized. On the other hand, the processes performed on the agent side may be restricted as to data processing to allow the server-side to perform more complex intelligence-driven rules and higher level data analysis.

Furthermore, optimal pushing of data to servers, together with parallel data communication with the server(s), are preferred functionalities of the system. The mobile intelligence engine of the agent can decide based on various parameters the optimal times of data sending and receiving. For example, the algorithm responsible for triggering this logic may be based on at least one condition including, but not limited to:
1. Location of the device;
2. Movement of the device (e.g. movement status);
3. Time of day;
4. Day of week;
5. Behavioral input (user's actions, such as voice calls); and/or
6. Device status information (battery status, temperature, memory capacity)

In data transmission both authentication and encryption methods and/or algorithms may be used, securing thus the transmission of potentially private information.

Data mining practices on the server-side are desired processes of the overall system, the server side in general playing one key part of the whole architecture. The server side can holistically input all the data from the devices, recognizing any possible patterns and processing data, and deriving information based on statistical analysis. Procedures, such as multi-variate generalized non-linear and linear regression methods, factor analysis, cluster analysis, classification utilizing, for example, neural networks, non-parametric tests and survival analysis may be automatically used, though discretely, on the received and locally stored data.

To provide a skilled reader with few tangible data analysis examples, exemplary embodiments of algorithms directed to context modeling and user segmentation are provided herein. In context modeling, a graph or map may be generated from data points to illustrate cellular towers. Instead of data collected by individual users (as done by most prior art arrangements), a more comprehensive dataset by a plurality of users, e.g. substantially all users, is preferably used. The nodes of a graph may be configured to correspond to cellular towers and the weights of the links reflect the observed number of 2-way jumps (for example, a jump from base station A to base station B and back) in the network (instead of relying on one-way jumps, which can also reflect movements instead of access jumps when halt), thus better communicating their possible physical closeness. A cluster analysis approach may be then applied and many cellular towers grouped together to form one physical area, though based on non-geographical data points. Later on, user-inputted or pre-coded semantic information such as "home" or "office" may be added based on time distribution based semantic algorithms. Even geo-location information can be attached to the cellular towers, if appropriate observations can be made in the agent, or alternatively, server-based matching technologies can be used.

In a similar fashion, a plurality of users can be clustered to form behaviorally coherent groups. The nodes of the graph represent this time users instead of cellular towers. The weights between the nodes may be Pearson correlation coefficients (or equivalent), calculated, for example, based on activity (e.g. overall device usage in minutes of usage per day) or location-based variables (for example distance between users). In the examples here, the original data to describe edges between nodes may be multi-dimensional, in other words meaning that multiple weights between nodes can be calculated in the first place.

In view of automatic clustering, a modularity-based approach to analyze the graphs produced by the platform is described. The modularity may be defined as follows. Denote by $e_{ij}$ half of the fraction of edges in the graph that connect vertices from community i to community j, given that i≠j. Half of the fraction is chosen instead of the full fraction since the normalization demands that $e_{ij}+e_{ji}$ equals the total fraction. Denote also by $e_{ii}$ the fraction of edges inside community i.

Using this notation, the sum $$b_i = \sum_{i=1}^{N} e_{ii}$$

equals the fraction of edges that fall within the communities of all edges, while $$a_i = \sum_{j=1}^{N} e_{ij}$$

is the fraction of ends of edges that emanate from vertices in group i. Now, if all edges were connected at random, the fraction of them inside community i would be $a_i^2$. This lets one define the modularity Q as $$Q = \sum_{i=1}^{N} (e_{ii} - a_i^2)$$

If the edges are random, the modularity equals zero, whereas values Q>0 indicate a clustered structure. Usually values of about Q>0.3 or 0.4 can be considered as signs of significant clustering.

The used method of optimizing modularity my operate as follows. Let initially each vertex form a community of its own. Consider all possible aggregations of two communities into one, and compute the modularity after these joins. Choose the one with the highest modularity and aggregate the communities together. Repeat this procedure iteratively for the new set of communities until there is no pair of two clusters the joining of which would increase the modularity. The communities at this point are then the best division of the original graph into communities in terms of the algorithm.

Denoted by $d_{ij}$ the measurement of node i in measurement group j. By dividing the values with the measurement group averaged ones $$\alpha_j = \frac{\sum_{i=1}^{N_p} d_{ij}}{N_p}$$

where $N_p$ is the number of nodes, the scaled measurements $\beta_{ij}$ can be defined as $$\beta_{ij} = \frac{d_{ji}}{\alpha_j}$$

leading to the vectors $$\gamma_k = (\beta_{kj})_{(j-1)}^{(N\alpha)}$$

describing the patterns of individual node k. Here, $N_\alpha$ is the number of measurement groups. Using these vectors, it is possible to define the similarity coefficients for nodes k and l as explained below.

Using these similarity coefficients, a fully connected weighted graph may be built with the edge between nodes k and l having the weight $w_{kl}$ determined, for example, by using Pearson correlation coefficient. The algorithm takes the weights of the edges into account. This may be done simply by redefining the factors $e_{ij}$ to $$e_{ij} = \frac{w_{ij}}{2\sum_x \sum_{y>x} w_{xy}}$$

where the summation is over all pairs of vertices. Newman's algorithm may be applied to produce a division of the nodes into clusters.

In addition to node clustering in the variety of relevant applications, various data mining procedures may be applied on the fly. For example, by using weighted averaging, the current movement activity of users can be updated on the servers. The outputs of all data mining practices can be substantially immediately taken into account in mobile agent operations. For example, by observing a link between two users, based on the conducted location based clustering algorithm (optionally incorporating predictive logic regarding the next hour's locations), more accurate observations can be immediately made in the respective user's wireless devices. For example, the devices can observe and servers analyze similarities in music consumption, this being a potential factor contributing to the likelihood of two users being interested in, for example, dating each other.

The data stored in the databases may be in a raw-level format (Unicode format), and various relations may be utilized in optimally storing the data. For example, a typical way to define an approximate geolocation is to identify cellular tower (base station) identification codes. Instead of storing all of the codes (MCC (mobile country code), MNC (mobile network code), LAC (location area code), CID ("cell-ID" in a GSM network, for example), the system may create a simple index for each tower, and this index is then used in mapping data points to cellular towers. In addition to heavy use of relations in linking data points to users, locations, context, weather and any other things, the database preferably utilizes time-based gradual aggregation of data as mentioned hereinbefore so that for the older data not as accurate, precise and granular data point storage is utilized as for the more recent data. For example, for the life feed items of a particular time period (e.g., week), a more accurate location for each of them might be stored. In contrast, the life feed data from e.g. a year ago can be equipped with only one day-level weighted average of the geo-location for each country.

In the data distribution API, virtualized and scalable clusters of databases may be used, optionally with a semantic database model enabling various kinds of queries, from direct to more complex, semantically formulated ones. The data distribution API may advantageously facilitate both pull and push model of data distribution. In addition, it centrally manages each user's data based on universal privacy settings, data sharing conditions, and/or other centralized data management settings the user has defined. The data distribution API secures that the data flows efficiently to proper interfaces in a correct format. The data distribution API queries the data from the server-side data management module 604, physically for example from the database clusters 607 by utilizing the data provisioning module 606 as the main interface. The data may be outputted in various formats. Widely used standards such as XML and GeoRSS may be applied for predefined data streams. In addition, customized interfaces can be easily built between the data distribution API and widely used external services offered in the communication network, using the request formats of the API. Some exemplary request types include at least one element including, but not limited to:
  1. Status information retrieval (e.g. location, context, profile status);
  2. Users currently in a certain location;
  3. Users having used the web browser at least once during a certain time period;
  4. List of countries a specific user has ever visited;
  5. The most typical location for a specific user;
  6. Likelihood estimates (predictions) for a particular user's location in 1 hour;
  7. The image content feed from a particular location during a certain time period; and
  8. Updated behavioral profile of a user based on application usage patterns Parameters that may be included in the queries comprise at least one element selected from the group including, but not limited to:
  1. User identification
  2. Time
  3. Location (old, current, future)
  4. Status information ("moving", "busy")
  5. Context (semantic, for example home, school, office, bus)
  6. Behavioral patterns (application usage)

The data distribution API may also facilitate external widgets or applications to perform queries in the database. For example, a platform-specific application may be built for social networking services, with its own user interface and functionalities that plots the data provided by this system through the data distribution API. The data distribution API does not take a standpoint on how the data is to be used, but specifies a multi-use interface to easily make queries to the intelligent and optimized database of life feed data. The same data distribution API can be combined with the external interface management module 603 to input data to the system's cumulative databases, instead of just distributing data from the database.

Figure 9:
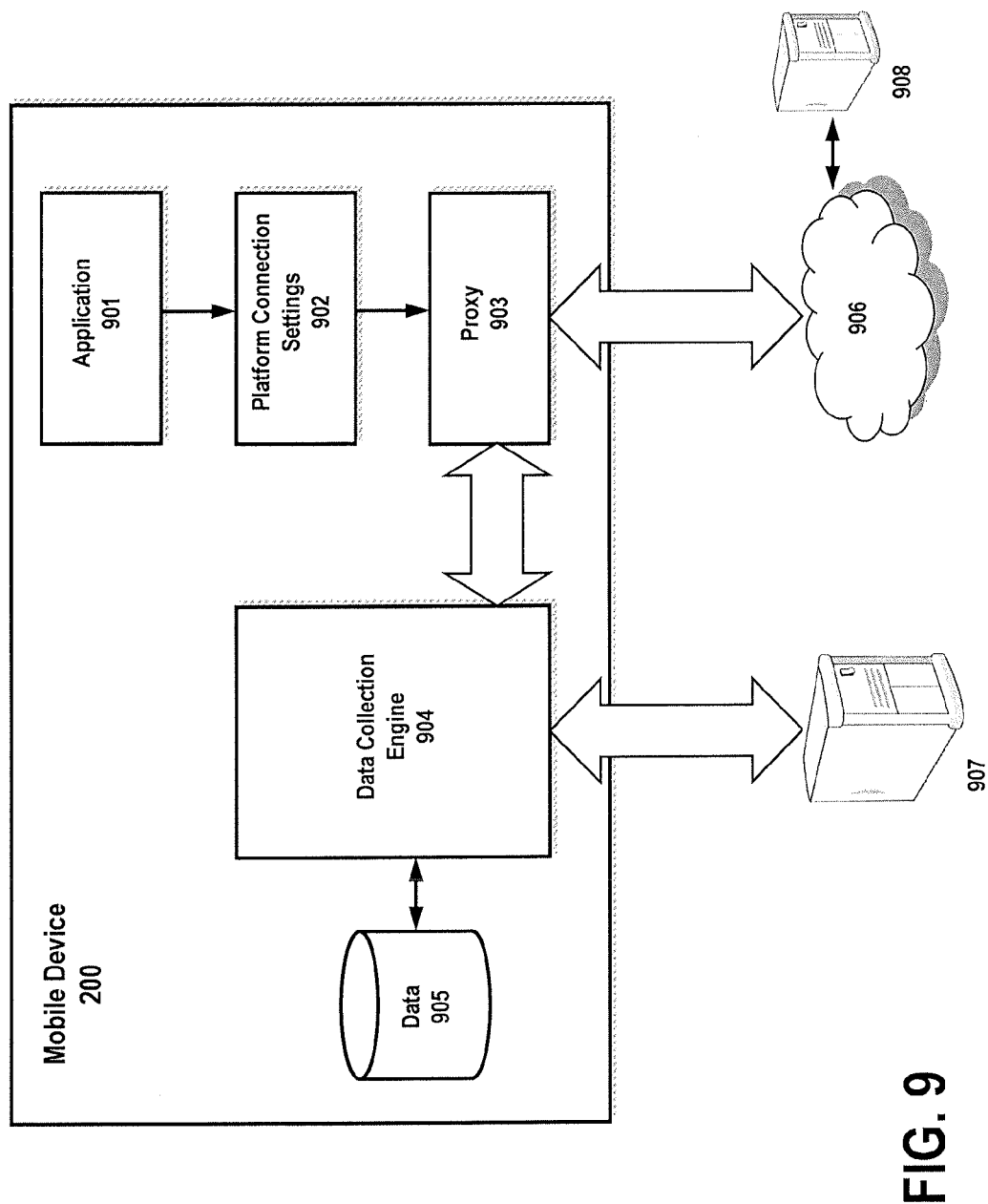
FIG. 9 illustrates an internal proxy arrangement for a mobile terminal under one embodiment.

Turning to FIG. 9, another embodiment is disclosed, where mobile device 200 is equipped with an internal proxy for channeling data streams going to/from the device. Such a configuration is particularly advantageous for controlling and processing network activity on device 200. In addition to the embodiment shown in FIG. 9, device 200 may incorporate any and all features described above in connection with mobile device configurations. In the illustrated embodiment, mobile device 200 comprises one or more applications 901, which in this example may be a browser or other network-capable application that communicates using platform connection settings 902 that establish a suitable connection format. For example, if application 901 is establishing a connection via a GSM carrier, settings 902 may configure an Access Point Name (APN) network identifier for the mobile device. A carrier may then utilize this identifier to determine what type of network connection should be created (e.g., what IP addresses should be assigned to the wireless device, what security methods should be used, and how or if, it should be connected to some private customer network). Additionally, Wi-Fi configurations or other types of configurations may be processed through platform connection settings 902. Outgoing and incoming communications are then routed through proxy 903. During operation, the APN may identify an IP Packet Data Network (PDN) that the device wants to communicate with, and may also be used to define the type of service, (e.g. connection to wireless application protocol (WAP) server, multimedia messaging service (MMS)), that is provided by the PDN.

Proxy 903 is preferably configured as a dynamic mobile device client that is capable of handling specific communications based on configurable rules. As one example, all HTTP communication may be routed through proxy 903, where proxy 903 may simply pass the communication to network 906, or may alternately modify outgoing requests to route them to a network proxy (908) communicatively coupled to network 906. Importantly, proxy 903 is configured to perform data collection for communications to/from application 901, which is forwarded to data collection engine 904, which in turn stores the data in 905 and may forward data to remote server 907.

As an example, application 901 may request a specific website (e.g., http://www.cnn.com/) that returns a page containing multiple objects, such as pictures, text, advertisements and the like. Data relating to the request and the received objects is collected by proxy 903. The collected data objects may be generated from network requests and responses including headers, parameters and a message body. Thus, for example, data relating to headers, parameters and message body of requests are collected, and data relating to the headers and body of the response is collected and sent to data collection engine 904 (and stored in 905). The collection and storage may occur in real-time, or may be arranged to occur on a predetermined schedule. When setting up the arrangement of FIG. 9, application 901 or platform connection settings 902 are preferably altered to route data through proxy 903 and/or data collection engine 904. The routing may be configured automatically via software, or manually re-programmed by a user.

Figure 10:
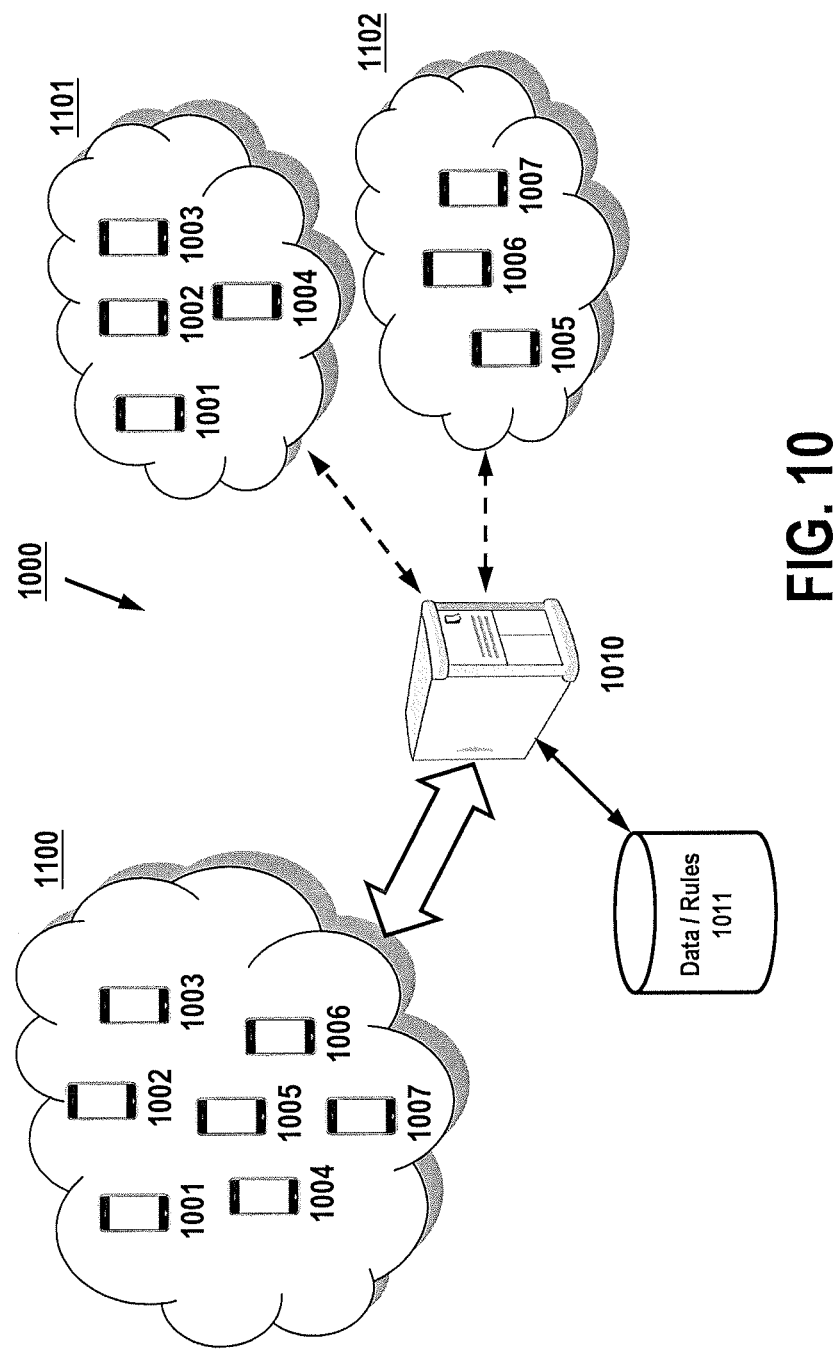
FIG. 10 illustrates an exemplary system for creating and managing sub-panels under one embodiment.

Turning to FIG. 10, one exemplary embodiment is provided illustrating the creation and management of sub-panels. Here, management server 1010 (which may also be embodied as part of external entities 114 and/or server arrangement 112 of FIG. 1) is communicatively coupled to a first panel 1100 comprising a plurality of mobile devices (1001-1007). Under a preferred embodiment server 1010 communicates wirelessly with panel 1100 over a telecommunications channel and/or WiFi channel. It is understood that other forms of communication known in the art are also possible, and that wired communication may be used as well. The communications between server 1010 and panel 1100 allows server to communicate data pertaining to mobile agents and associated observation logic respectively configured on each of devices 1001-1007. As discussed above, observation logic may comprise observation interfaces to handle monitored observations, determine the context, activities and device information, and stream data to a data conversion and pre-processing layer, which may be configured to perform desired raw-level data conversions and processing activities on the data. A triggering engine may also coordinate observations and an observation intelligence engine may receive external data (e.g. from server 1010, directed by the mobile intelligence engine 553), and maintaining the rules of data observations and pre-processing, and guiding respective modules.

Server 1010 is communicatively coupled to data/rules storage apparatus 1011, which stores data collection and statistical processing rules for system 1000. Initially, server 1010 keeps data on a pool of devices in panel 1100, including media exposure data, app usage data, network usage data, etc. Additionally, server 1010 may additionally store in storage 1011 demographic data, identification data, preference data, purchase data, etc. pertaining to users of devices (1001-1007) of pool 1100. At specific times, which may be predetermined or triggered by certain events and/or signals, server 101 may load from data/rules database a set of instructions that allow system to modify data collection rules for devices in panel 1100. In certain embodiments, the modification of data collection rules includes the creation of sub-panels (or "sub-pools"). In the example of FIG. 10, server 1010, after loading data collection rules from 1011, processes information from devices 1001-1007 in panel 1100. After running the rules, server 1010 determines which devices from panel 1100 meet the criteria defined by the rules.

As a result of the processing, server 1010 prepares and communicates modification instructions to some or all devices in panel 1100 meeting rule requirements. Under preferred embodiment, the modification instructions comprise data, executable or otherwise, allowing devices of panel 1100 to modify data collection capabilities and/or parameters in each of devices 1001-1007. In the example of FIG. 10, modification instructions are transmitted to devices 1001-1007, resulting in the creation of sub-panels 1101, 1102, each comprising their respective number of devices (1001-1004, 1005-1007). Each sub panel may be configured such that one (1101) collects one or more types of data, while another (1102) collects one or more other types of data. In another embodiment, both sub-panels may collect the same type(s) of data, but one panel collects data using different parameters from the other.

It can be appreciated by those skilled in the art that multiple variations may be possible under the present disclosure. Data collection may be modified automatically based on a particular requirement set that may be dynamically updated/modified. As the data collection requirements for a panel changes, smaller subsets of the panel may be created and managed to fulfill those requirements. In many cases, collecting all data for a complete panel (which in certain cases may involve hundreds, if not thousands, of panelists) will be inefficient and/or computationally expensive. Furthermore certain panelists will provide inferior levels of quality and/or quantity of data compared to others, and device usage/configurations may vary between devices. By automating the device data collection processes, the quality of data may be increased while maintaining a cost-benefit balance for specific studies. In addition, maintaining panels and sub-panels may become more efficient, particularly when there is meaningful "churn" or back-outs between or within panels.

Figure 11:
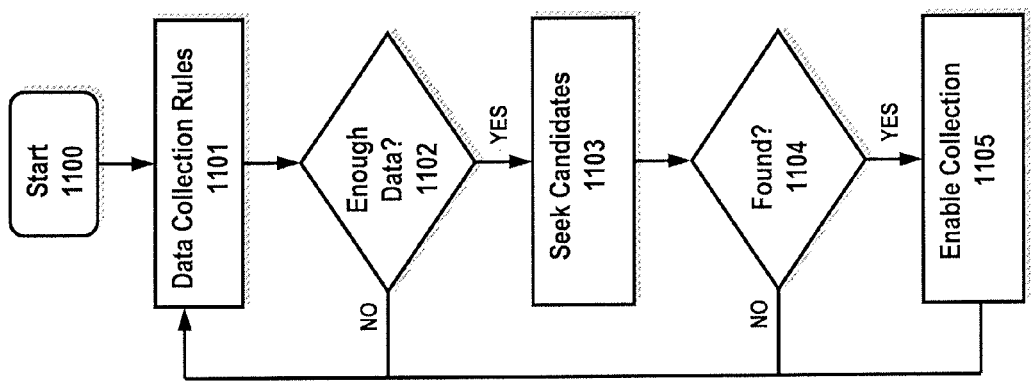
FIG. 11 illustrates an exemplary process for creating one or more sub-panels and for enabling various data collection.

Turning to FIG. 11, an exemplary method is disclosed for arranging/managing sub-panels and data collection rules. After the process starts in 1100 rules sets for a specific panel or cub-panel are retrieved from a management database in 1101. The data collection rules may be retrieved on a pre-defined interval, or may be retried based on a specific event or panel status. The retrieved rules include information about specific requirements for collecting defined data points from the panel (e.g., a sample of X panelists should collect data Y in Z time intervals). Once the rules are retried, a determination is made in 1102 on whether or not enough data exists for individual users and/or groups of users. If the processing determines that a lack of data exists (NO), the process returns to 1101, where, either new rules are retrieved, or existing data collection rules are modified. Under one exemplary embodiment, data collection rules may be expressed in terms of ranges. Initially, in step 1102, a "best" optimal range value is used; if this value does not have supporting data in the system, it moves to the "second best" value, and so on. In another embodiment, if a lack of sufficient data exists in 1102, the system waits a predetermined period of time in order that further data collects in the system. The data may include one or more specific types of data, or may include all data being collected. The process may continue to repeat for certain periods of time until sufficient data is found.

Once sufficient data exists in the system (YES), the method moves to step 1103, where the system seeks candidates (i.e., devices and/or users associated with respective devices) for one or more sub-panels. Thus, from a main panel (or "parent" panel), a group of suitable panelists meeting defined qualifiers from data collection rules are selected for one or more sub-panels (or "child" panels). These qualifiers may include references to earlier-collected data, demographic characteristics, device usage characteristics and/or patterns behavioral variables, etc. If a sufficient group is found in 1104, the system transmits data and/or instructions (commands) to each device 1105 qualifying for the group to enable each device to collect a specific type of data. In one embodiment, the system may transmit one or more commands that enable one or more reporting functions on a device pertaining to one or more types of data being collected on the device. In another embodiment, the system may transmit one or more commands that enable one or more reporting functions, while disabling one or more reporting functions on other types of data being collected on a device. This embodiment may be advantageous for streamlining the data being received from reporting devices, and minimizing superfluous data or other data not necessary for the data collection rules defined for a particular sub-panel. In yet another embodiment, the system may transmit one or more commands that enable a data collection capability in the qualifying devices, where that capability was previously disabled on the device. Similarly, the system may transmit one or more commands that enable a data collection capability in the qualifying devices, while disabling other data collection capabilities In yet another embodiment, the system flags qualifying devices as being members of a sub-panel for a specific data collection purpose. In this embodiment, non-qualifying devices for specific sub-panels may be flagged as well. This configuration may be particularly advantageous in cases where multiple sub-panels are simultaneously operating; by flagging devices and their qualification/non-qualification for specific panels, a data collection operator may more easily manage larger group of devices among multiple panels and sub-panels. As an example, turning briefly to FIG. 13, a simplified embodiment is illustrated 1300, where a plurality of devices in a panel (Device 01-11) are subjected to steps 1100-1105, where data collection rules pertaining to three different panels (Panels A-C) are processed. Here, Device 01, 04-05, 08-09 and 11 qualified for "Panel A" which requires the collection and reporting of data types 1, 2, 8 and 12. The data types, and other data types discussed below, may comprise network usage data, call data, text data, social media data, MMS data, battery data, phone charging data, web-usage data, audio metering data including audio codes and/or signatures, and other similar or related types of data. It is understood that the aforementioned data types are merely examples of data types, and is not intended to be exhausting or limiting. For "Panel B", the process of FIG. 11 in light of the data collection rules determined that Device 03, 07 and 10 qualified, where each of these devices will report to the system data collected on data types 3, 6, and 10. Similarly, for "Panel C", qualifying devices 01, 04 and 11 will report to the system data collected on data types 1, 2, 6, 8 and 12. It can be seen in this example that individual devices may qualify for one panel, or multiple panels, which may result in overlapping devices among panels. In addition, the number of data types being collected and received throughout all sub-panels may be tracked (e.g., Devices 01, 04, 11 have 6 data types being collected; Devices 03, 07, 10 have 3 data types being collected, etc.). Also, a tabulation of data types being tracked throughout all sub-panels ("Final Data Types") may be listed as well.

While the disclosure provided above is advantageous for managing devices, it may also be necessary to manage users of devices (panelists) as well. In certain cases, panelists may be non-compliant and configure and/or operate their devices in a manner that is inconsistent with the data collection rules used for their panel. For example, panelists may manually turn off a WiFi capability that is needed for certain data collection, or may limit or stop using an application (e.g., game, media application) that was initially used for their qualification. In other cases, panelists may limit or stop using a device altogether in favor of another device that may not be equipped with data collection software. Such attrition is sometimes referred to as "churn", "back-out" or "drop-out." It is important for a data collection system to be able to dynamically account for such actions, and even forecast such events for balancing panels and sub-panels. Such capabilities may be useful, particularly in cases where there are established panels and/or subpanels comprising data relating to panelists that have participated previously in one or more panels/sub-panels.

Exemplary techniques for managing panels is described in U.S. patent application Ser. No. 10/442,206, to Gopalakrishnan et al., titled "Method and Systems for Constructing and Maintaining Sample Panels," filed May 20, 2003, which is assigned to the assignee of the present application and is incorporated by reference in its entirety herein. The disclosure describes techniques for maintaining a geo-demographic balance for sample panels using census data, and for forecasting back-out data on panelists meeting certain geo-demographic characteristics. The present disclosure improves upon those techniques by expanding the panel balancing techniques to device usage and modification of devices for data collection.

For determining sub-panels, the system may segment a panel and/or data points, such that panelists (and their respective devices) are identified as one or more classes, subject to control variables that may be defined by a particular enumeration or categorization of potential participants and/or data relating to specific data collection rules and/or demographics. In certain embodiments a forecasted participation model is developed and employed to predict the likelihoods that panelists and/or devices within each enumerated class will be compliant with data collection rules for a panel. The forecasted participation model comprises forecasts of numbers of potential panelists within the various enumerated classes that have provided data collection information that may be compliant with one or more data collection rules existing in the database. These forecasts provide a processor (e.g., server 1010) with a dynamic assessment of operational requirements to achieve the goals of certain data collection rules.

During the data collection and determination step of 1102, it is possible for parameters to change over time and therefore affect the system accuracy. A change in the enumeration category for a particular participant may occur, where, for example, a panelist's data usage drops due to decreased usage of a particular application, or backs-out of data collecting participation, or increases due to a particular life event causing the increase (e.g., dating, becoming active on a social media account, etc.). In the aforementioned examples of parameter changes, the system will compensate for such changes in order for the enumerated classes of a panel to stay within the ranges defined by the data collection rules. In certain embodiments, system compensates by adjusting the forecast or forecasts for one or more of the enumerated classes. Once the assessment of the influence of the parameters is made, the system establishes or updates the forecasted participation model accordingly. In one embodiment, different back-out data and models may be produced for panelists based on historical, demographical, device-specific and/or application-specific data A forecasted participation model should generate data relating to compliance with data collection rules and participation rates and back-out data for panels and sub-panels. The model should correlate to enumerated categories for different points in time or stages of panel recruitment. Back-out data may be produced using historical data averages, trend estimates of historical data and other standard statistical techniques. Once the forecasted participation model for the sample panel is established, the enumerated sample pool for panels and sub-panels in certain embodiments may be partitioned and sorted in ascending order of the variables that may need to be controlled. When the sample panel forecasted participation model has been established, then the sample panel checked to see if it is within the range of data collection rules. If the sample panel is out of range, then the system (1000) assesses the influence of parameters and changes in enumeration categories to update the sample panel forecasted participation model. Thereafter, the sample panel is established or updated to bring it within the desired operational range based on the updated forecasted participation model. If a sample composition is not within the desired range, the system may assesses the influence of parameters and adjust the sample panel forecasted participation model.

Figure 12:
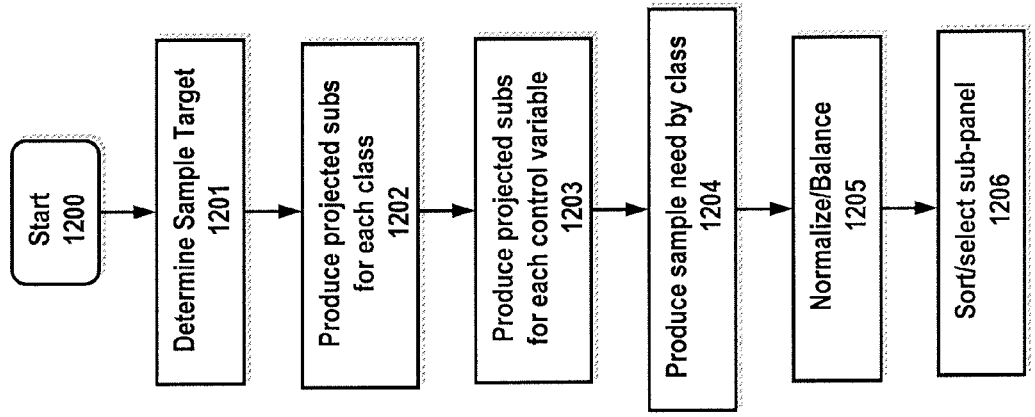
FIG. 12 illustrates as exemplary process for maintaining panels and/or subpanels according to class and control variables under one embodiment.

FIG. 12 illustrates an exemplary embodiment for selecting/maintaining panelists within a panel and/or sub-panel. The method starts 1200 by determining a sample target for one or more data collection rules 1201. Preliminarily, an enumerated sample pool may be established in accordance with standard statistical practices. In certain embodiments, the sample pool is a set of devices potentially eligible for meeting data collection rule requirements, and/or devices previously selected for panels and/or sub-panels. Projected sub-panel data may be produced for each class 1202 within each control variable. The projected sub-panel data represents a prediction of the number of devices within each respective class within each control variable expected at a future time to be compliant with data collection rules.

With reference to block 1203, overall projected sub-panel data for each control variable are produced, as a basis for producing sub-panel data collection rule compliance data for each class within the control variable. For each control variable, the overall projected compliance may be expressed as a percentage or proportion of the overall sub-panelist sample target which is required or a weighted average of potentially compliant devices for all classes. Accordingly, the overall projected sub-panelist data for each control variable may represent the total number of forecasted sub-panel participants for all classes. In order to translate the sub-panel target data into data representing the required sample for the class, a preliminary sample need by class determination is made in block 1204, wherein the sub-panel target data is divided by a sub-panel yield (e.g., data collected) for the class. The preliminary sample need data by class, therefore, may represent a forecasted sample required to balance the class in the future, without regard to operational concerns limiting the ability to provide samples at a particular time.

Accordingly, in order to distribute the overall sample target, which may be limited by operational concerns, among the various classes based on their proportion to the total sample need, in block 1205 data representing a normalized sample target for each class is produced as the product of the overall sub-panel sample target data and a ratio of (a) the preliminary sample need data by class, and (b) the sum of all preliminary sample need data for all classes within the control variable.

For each class within each control variable, the difference between a projected sub-panel and its universal estimate is determined to assess the extent to which that class is forecast to be out of balance in the future. Then, the extent of such differences is assessed for each control variable, and one or more control variables are selected to receive priority so that these control variables consequently receive priority for purposes of balancing. In certain embodiments, the control variables are selected in descending order of importance from the control variable which is most out of balance towards that which is least out of balance. In certain ones of these embodiments, either the top two or three control variables are selected, in order from the top. However, in certain embodiments two or more control variables may be highly correlated. For example, for a wireless data usage parameter, it may be found that a control variable based on a multimedia application (e.g., a movie-streaming application) is correlated to higher wireless data usage rates. In such embodiments, the more influential control variable may be selected over the other, since balancing the first will very likely bring the second into balance automatically. Once the sub-panel parameters have been processed, devices may be selected and further sorted for sub-panel participation in 1206.

It may be appreciated by those skilled in the art the present disclosure provides a number of advantageous features for automatically creating and maintaining sub-panels. By balancing newly-created or existing sub-panels, adjustments may be made to accommodate data collection rules despite a certain level of non-compliance from individual panelists. Furthermore, by organizing sub-panels using any of the techniques described above, large-scale data collection may be made more efficient and accurate.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A processor-based method to establish a panel of panelist user devices, comprising:
   processing device data obtained from the panel of panelist user devices to determine if the device data related to the panelist user devices complies with data collection rules;
   defining the panel of panelist user devices to include a first panelist user device and a second panelist user device determined to be compliant with the data collection rules; and
   generating modification instructions to cause the panel of panelist user devices to enable data collection operations, the data collection operations increasing a location retrieval rate of the first panelist user device based on an increasing proximity of the first panelist user device to the second panelist user device.

2. The processor-based method of claim 1, wherein the device data further includes at least one of network usage data, call data, text data, social media data, MMS data, battery data, phone charging data, web-usage data, audio codes or audio signatures.

3. The processor-based method of claim 1, wherein the data collection rules include a first parameter and a second parameter for the device data, the first and the second parameters including at least one of a user identification, a time, a panelist user device location, a user status information, or an application usage pattern.

4. The processor-based method of claim 3, further including generating a second panel of panelist user devices compliant with one of the second parameters of the data collection rules when the panelist user devices are not compliant with the first parameter of the data collection rules, the first and the second panel of panelist user devices collecting a same type of data.

5. The processor-based method of claim 1, further including processing the device data from the panel and redefining the panel with other panelist user devices when device data from the panel is not compliant with the data collection rules.

6. The processor-based method of claim 1, wherein the panelist user devices are portable computing devices operating data collection software to communicate wirelessly over a network.

7. A computer system to communicate over a network to portable user devices, comprising:
   a processing apparatus, operatively coupled to an input and a storage, wherein the processing apparatus is to:
   process device data retrieved from the portable user devices to determine if device data related to the portable user devices complies with data collection rules;
   define a panel to include a first portable user device and a second portable user device determined to be compliant with the data collection rules; and
   generate modification instructions for the panel to cause the panel of portable user devices to enable data collection operations, the data collection operations increasing a location retrieval rate of the first portable user device based on a threshold distance value between the first portable user device and the second portable user device.

8. The system of claim 7, wherein the device data includes at least one of network usage data, call data, text data, social media data, MMS data, battery data, phone charging data, web-usage data, audio codes or audio signatures.

9. The system of claim 7, wherein the data collection rules include a first parameter and a second parameter for the device data, the first and the second parameters including at least one of a user identification, a time, a portable user device location, a user status information, or an application usage pattern.

10. The system of claim 9, wherein the processing apparatus is to generate a second panel of portable user devices compliant with one of the second parameters of the data collection rules when the portable user devices are not compliant with the first parameter of the data collection rules, the first and the second panel of portable user devices collecting a same type of data.

11. The system of claim 7, wherein the processing apparatus is to process device data from the panel and redefine the panel with other portable user devices if it is determined that the device data from the panel is not compliant with the data collection rules.

12. The system of claim 7, wherein the portable user devices are portable computing devices operating data collection software and communicate wirelessly over a network.

13. An article of manufacture comprising instructions for operating a panel pursuant to a research operation, that when executed, cause a processor to at least:
   process device data obtained from portable user devices to determine if device data related to the portable user devices complies with data collection rules;
   define the panel to include a first portable user device and a second portable user device determined to be compliant with the data collection rules;
   generate modification instructions in the central processing apparatus to cause the panel of portable user devices to enable data collection operations, the data collection operations increasing a location retrieval rate of the first panelist user device based on a threshold distance value between the first portable user device and the second portable user device.

14. The article of manufacture of claim 13, wherein the device data includes at least one of network usage data, call data, text data, social media data, MMS data, battery data, phone charging data, web-usage data, audio codes or audio signatures.

15. The article of manufacture of claim 13, wherein the data collection rules include a first parameter and a second parameter for the device data, the first and the second parameters including at least one of a user identification, a time, a portable user device location, a user status information, or an application usage pattern.

16. The article of manufacture of claim 15, wherein the instructions further cause the processor to generate a second panel of portable user devices compliant with one of the second parameters of the data collection rules when the portable user devices are not compliant with the first parameter of the data collection rules, the first and the second panels of portable user devices collecting a same type of data.

17. The article of manufacture of claim 13, wherein the instructions further cause the processor to process device data from the panel and redefine the panel with other portable user devices if it is determined that the device data from the panel is not compliant with the data collection rules.

* * * * *

UNITED STATES PATENT AND TRADEMARK OFFICE
CERTIFICATE OF CORRECTION

PATENT NO. : 9,331,892 B2
APPLICATION NO. : 13/837658
DATED : May 3, 2016
INVENTOR(S) : Tero Lindberg It is certified that error appears in the above-identified patent and that said Letters Patent is hereby corrected as shown below:

In the claims

Column 30, lines 33-34 (Claim 13): Delete the words "in the central processing apparatus" between "instructions" and "to".

Signed and Sealed this
Twenty-eighth Day of June, 2016

Michelle K. Lee
*Director of the United States Patent and Trademark Office*